United States Patent
Ganjam et al.

(10) Patent No.: US 10,776,375 B2
(45) Date of Patent: Sep. 15, 2020

(54) RETRIEVAL OF ATTRIBUTE VALUES BASED UPON IDENTIFIED ENTITIES

(71) Applicant: Microsoft Corporation, Redmond, WA (US)

(72) Inventors: Kris Ganjam, Seattle, WA (US); Zhimin Chen, Redmond, WA (US); Kaushik Chakrabarti, Bellevue, WA (US); Surajit Chaudhuri, Redmond, WA (US); Vivek Narasayya, Redmond, WA (US); James Finnigan, Redmond, WA (US); Kanstantsyn Zoryn, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 738 days.

(21) Appl. No.: 14/283,273

(22) Filed: May 21, 2014

(65) Prior Publication Data

US 2015/0019540 A1    Jan. 15, 2015

Related U.S. Application Data

(60) Provisional application No. 61/846,574, filed on Jul. 15, 2013.

(51) Int. Cl.
*G06F 16/248* (2019.01)
*G06F 16/2457* (2019.01)
(Continued)

(52) U.S. Cl.
CPC ...... *G06F 16/248* (2019.01); *G06F 16/24578* (2019.01); *G06F 17/246* (2013.01); *G10L 15/183* (2013.01); *G10L 2015/228* (2013.01)

(58) Field of Classification Search
CPC ............. G06F 17/30554; G06F 16/248; G06F 16/24578
(Continued)

(56) References Cited

U.S. PATENT DOCUMENTS 5,701,469 A  12/1997  Brandli et al.
6,832,196 B2  12/2004  Reich
(Continued)

FOREIGN PATENT DOCUMENTS

CN  101258496 A  9/2008
EP  1238348 A2   9/2002
(Continued)

OTHER PUBLICATIONS

"Response to the International Search Report (ISR) and Written Opinion for PCT Patent Application No. PCT/US2014/046458", Filed Date: Jul. 29, 2015, 11 pages.
(Continued)

*Primary Examiner* — Joshua Bullock
(74) *Attorney, Agent, or Firm* — Medley, Behrens & Lewis, LLC

(57) ABSTRACT

Various technologies that facilitate performance of a data finding data (DFD) search are described herein. A user specifies entities, for example, by entering the entities into a query field, selecting the entities from a computer-executable application, or the like. The user further specifies an attribute of the entities that is of interest. A query is constructed based upon the entities and the attribute, and a search for tables is performed based upon the entities and the attribute. Values of the attribute for the selected entities are identified in a table, and the values of the attribute are returned.

20 Claims, 17 Drawing Sheets

(51) Int. Cl.
  *G10L 15/183* (2013.01)
  *G06F 17/24* (2006.01)
  *G10L 15/22* (2006.01)
(58) Field of Classification Search
  USPC .......................................................... 707/723
  See application file for complete search history.

(56) References Cited

U.S. PATENT DOCUMENTS

| | | | |
|---|---|---|---|
| 7,730,060 | B2 | 6/2010 | Chakrabarti et al. |
| 8,015,172 | B1 | 9/2011 | Cave et al. |
| 8,260,809 | B2 | 9/2012 | Platt et al. |
| 8,380,505 | B2 | 2/2013 | Konig et al. |
| 2003/0033287 | A1 | 2/2003 | Shanahan et al. |
| 2003/0033288 | A1 | 2/2003 | Shanahan et al. |
| 2003/0167266 | A1 | 9/2003 | Saldanha et al. |
| 2004/0010410 | A1 | 1/2004 | Oh et al. |
| 2007/0011297 | A1* | 1/2007 | Boylan ............. H04L 29/12009 709/223 |
| 2007/0217701 | A1 | 9/2007 | Liu et al. |
| 2007/0219956 | A1* | 9/2007 | Milton ................. G06F 17/246 |
| 2008/0016041 | A1 | 1/2008 | Frost et al. |
| 2008/0154611 | A1 | 6/2008 | Evermann et al. |
| 2009/0319542 | A1 | 12/2009 | Le brazidec et al. |
| 2013/0031089 | A1 | 1/2013 | Allen et al. |
| 2013/0124194 | A1 | 5/2013 | Nadal |
| 2013/0173639 | A1 | 7/2013 | Chandra et al. |
| 2013/0238621 | A1 | 9/2013 | Ganjam et al. |
| 2015/0019540 | A1 | 1/2015 | Ganjam et al. |
| 2015/0363478 | A1* | 12/2015 | Haynes ............. G06F 17/30572 707/625 |

FOREIGN PATENT DOCUMENTS

| | | | |
|---|---|---|---|
| JP | 2001319046 | A | 11/2001 |
| JP | 2005242995 | A | 9/2005 |
| KR | 20010095401 | A | 11/2001 |
| KR | 1020010095401 | A | 11/2001 |
| KR | 20120057786 | A | 6/2012 |
| KR | 1020120057786 | A | 6/2012 |
| RU | 2273879 | C2 | 4/2006 |
| RU | 2013150524 | A | 5/2015 |
| WO | 0106397 | A2 | 1/2001 |
| WO | 0229627 | A2 | 4/2002 |
| WO | 02046956 | A3 | 6/2002 |
| WO | 2002046956 | A2 | 6/2002 |

OTHER PUBLICATIONS

Heddings, Lowell, "How to Use AutoFill on a Google Docs Spreadsheet", Retrieved at: <<http://www.howtogeek.com/howto/15799/how-to-use-autofill-on-a-google-docs-spreadsheet-quick-tips/>>, dated Apr. 28, 2010, retrieved on Jan. 26, 2015, 4 pages.
"Table Snippets in Google Search", Retrieved at: <<http://googlesystem.blogspot.nl/2011/11/table-snippets-in-google-search.html>>, dated Nov. 17, 2011, retrieved on Apr. 22, 2015, 2 pages.
"Office Action Issued in Columbian Patent Application No. 168426", dated Feb. 16, 2016, 4 Pages. (W/O English Translation).
"Written Opinion of the International Preliminary Examining Authority for PCT Patent Application No. PCT/US2014/046458", dated Oct. 21, 2015, 5 pages.
"International Preliminary Report on Patentability for PCT Patent Application No. PCT/US2014/046458", dated Dec. 21, 2015, 6 pages.

"Office Action Issued in Chinese Patent Application No. 201480040374.4", dated May 19, 2017, 14 Pages.
"Office Action Issued in Mexican Patent Application No. MX/a/2016/000687", dated Jun. 29, 2017, 4 Pages.
"Office Action Issued in Chilean Patent Application No. 74-2016", dated Jul. 14, 2017, 6 Pages.
"Office Action Issued in Chilean Patent Application No. 74-2016", dated Jan. 24, 2018, 6 Pages.
"DashScribe VoiceForms,The Best Way to Gather Data by Voice", Retrieved From: https://web.archive.org/web/20130522192115/https://www.dashscribe.com/, May 22, 2013, 4 Pages.
Allauzen, et al., "Voice Query Refinement", In Proceedings of 13th Annual Conference of the International Speech Communication Association, Sep. 9, 2012, 4 Pages.
"Final Office Action Issued in U.S. Appl. No. 14/283,273", dated Oct. 18, 2017, 14 Pages.
"Non Final Office Action Issued in U.S. Appl. No. 14/283,273", dated Jan. 20, 2017, 14 Pages.
"Non Final Office Action Issued in U.S. Appl. No. 14/283,273", dated Jun. 13, 2018, 20 Pages.
"Office Action Issued in Colombian Patent Application No. 168426", dated Dec. 18, 2017, 10 Pages.
"Office Action Issued in Columbian Patent Application No. 168426", dated Feb. 11, 2016, 4 Pages. W/O English Translation.
"Third Office Action Issued in Chinese Patent Application No. 201480040338.8", dated Aug. 15, 2018, 12 Pages.
"First Office Action and Search Report Issued in Chinese Patent Application No. 201480040374.4", dated May 19, 2017, 15 pages.
"Second Office Action Issued in Chinese Patent Application No. 201480040374.4", dated Feb. 26, 2018, 12 Pages.
"Office action Issued in Russian Patent Application No. 2016100989", dated May 17, 2018, 7 Pages. W/O English Translation.
"Office action Issued in Japanese Patent Application No. 2016-527001", dated May 29, 2018, 7 Pages.
"Office Action Issued in Israel Patent Application No. 243379", dated Jul. 17, 2018, 6 Pages.
"Office Action Issued in Mexican Patent Application No. MX/a/2016/000687", dated Nov. 16, 2018, 8 Pages.
"Office Action Issued in Chile Patent Application No. 74-2016", dated Jan. 24, 2018, 6 Pages.
"Office Action Issued in Chile Patent Application No. 74-2016", dated Jul. 14, 2017, 6 Pages.
Chitu, Alex, "Table Snippets in Google Search", Retrieved From: http://googlesystem.blogspot.nl/2011/11/table-snippets-in-google-search.html, Nov. 17, 2011, 2 Pages.
Flood, et al., "NLP-SIR: A Natural Language Approach for Spreadsheet Information Retrieval", In Journal of Computing Research Repository, Aug. 8, 2009, 12 Pages.
Heddings, Lowell, "How to Use AutoFill on a Google Docs Spreadsheet", Retrieved From: http://www.howtogeek.com/howto/15799/how-to-use-autofill-on-a-google-docs-spreadsheet-quick-tips/, Apr. 28, 2010, 6 Pages.
"Office Action Issued in Mexican Patent Application No. MX/a/2016/000687", dated Mar. 5, 2018, 6 Pages.
"Office Action Issued in Mexico Patent Application No. MX/a/2016/000687", dated Jun. 29, 2017, 4 Pages.
"International Preliminary Report on Patentability Issued in PCT Application No. PCT/US2014/046458", dated Dec. 21, 2015, 6 Pages.
"International Search Report and Written Opinion Issued in PCT Application No. PCT/US2014/046458", dated Apr. 29, 2015, 10 Pages.
"Second Written Opinion Issued in PCT Application No. PCT/US2014/046458", dated Oct. 21, 2015, 5 Pages.
"Office Action Issued in Chinese Patent Application No. 201480040374.4", dated Sep. 29, 2018, 9 Pages.

* cited by examiner

FIG. 10

CONTENT PAGE

XXXX XXXXXXX XXXX X XXXXXXXXXXXXX XXX XXXXXXX XX XXXXXXX XX
XXXXXXXXXXXXXXXXXXXXXXXXXXX XXXXX XXXXXX XXXXXXXXXXXX
XXXXXXXXXXXXXXXXX XXXXXXX XXXXX XXXXXXXXXXXX XXXXX XXXX
XXX XXXXXXXXXXXXXXXX XXXX
ENTITY 1; ENTITY 2; ENTITY 3; ENTITY 4; ENTITY 5; ENTITY 6
XXXXXXXXXXXXXXXXXXXX XXXXXXXXXXXXX XXXXXXXXXXXXXXXXXXX

1000

1001

412

1002

OPTION 1
OPTION 2
OPTION 3
DFD SEARCH

RETRIEVAL OF ATTRIBUTE VALUES BASED UPON IDENTIFIED ENTITIES

RELATED APPLICATION

This application claims priority to U.S. Provisional Patent Application No. 61/846,574, filed on Jul. 15, 2013, and entitled "TABLE RETRIEVAL AND MANIPULATION BASED UPON NATURAL LANGUAGE QUERIES", the entirety of which is incorporated herein by reference.

BACKGROUND

Computer-executable spreadsheet applications are conventionally configured to allow users thereof to organize and analyze tabular data. Generally, a spreadsheet of a computer-executable spreadsheet application includes numerous cells arranged in rows and columns, wherein each cell can retain a respective value (or function that outputs a value based upon data in other cells). A user of the spreadsheet application may select a cell and manually modify content thereof, either by specifying a new value to be included in the cell or by modifying a function used to compute a value for the cell.

Conventional spreadsheet applications are well suited for organizing and manipulating tabular data, particularly when the user is familiar with functions supported by the spreadsheet applications (and commands that invoke such functions). In an example, the user can cause values in a respective plurality of cells to be summed by setting forth a textual command, such as "SUM", and subsequently identifying cells that include values that are desirably included in a summation.

In conventional spreadsheet application, however, it can be arduous to augment a table with data that is not already loaded into the spreadsheet application. For example, a novice user may load a table into the spreadsheet application, where the table includes a column of entities (e.g., where an entity is a string that is representative of a person, place, or thing). Thus, in an example, the column of entities can include city names, state names, company names, etc. As can be ascertained, a person, place, or thing can be described by an attribute. For instance, the state of California can be described by numerous attributes, such as population (e.g., in a certain year), average rainfall (e.g., over several years), etc., wherein the attributes have values respectively corresponding thereto. Conventionally, for example, to augment a table to add a column of attribute values in correspondence with respective entities, a user must perform a search for the desired attribute values (e.g., through use of a conventional search engine), identify a data source that includes the attribute values (e.g., a table or set of tables), determine that the data source is trustworthy, and then manually transport data from the identified source into the table at the appropriate locations. It can be ascertained that this can be a time-consuming and frustrating task.

SUMMARY

The following is a brief summary of subject matter that is described in greater detail herein. This summary is not intended to be limiting as to the scope of the claims.

Described herein are various technologies pertaining to data finding data (DFD) searches, as well as mechanisms for viewing and manipulating data (e.g., tabular data) identified during DFD searches. In an exemplary embodiment, an application executing on a client computing device can include a plurality of machine-readable entities, wherein an entity is a string that is representative of a person, place, or thing. For example, the application can be a spreadsheet application, and the entities may be included in a column of a table loaded into the spreadsheet application. The client computing device may then receive an indication (e.g., from a user or another program executing on the client computing device) that the entities have been selected. Furthermore, the client computing device can (optionally) receive an attribute (e.g., a string representative of an attribute of people, places, or things represented by the entities) specified by the user or program.

The application can then transmit the entities (and the attribute) to a search system. For example, the application can construct a query that includes the entities. In another example, the application can transmit the entities and the attribute to the search system, and the search system can construct the query. The search system executes a search over an index of tables based upon the query. The search system can identify a source table that includes attributes and/or attribute values that may to be relevant to the entities used to form the query (and optionally the identified attribute name), and can transmit at least a portion of the source table to the application executing on the client computing device. In an exemplary embodiment, when the search system receives an attribute identified by the user, the search system can identify a source table that includes at least a subset of the specified entities, can extract values of the specified attribute from the source table, and can transmit such values to the application executing on the client computing device. The attribute values can then be presented on a display or stored in a table in a computer-readable storage medium, in appropriate correlation with the entities. Accordingly, the table from which the entities were initially selected can be relatively quickly augmented with values of an attribute identified by the user.

In another exemplary embodiment, responsive to receiving the entities (and optionally an attribute), the search system can identify a source table that includes values of the attribute for the entities, and can generate a table snippet that summarizes the source table. The table snippet can include, for example, a title of the source table, a source location of the source table (e.g., a URL of a web page that includes the source table), and a representative portion of the table. The table snippet can be transmitted to the computer-executable application executing on the client computing device, which can display the table snippet on a display for review by a user. The user can review the table snippet to determine whether any content of the source table (summarized by the table snippet) is to be incorporated into the table loaded into the spreadsheet application (e.g., whether a column is to be added to the table loaded into the spreadsheet application). For instance, the table snippet can include a selectable button positioned in graphical relation to a column summarized in the snippet.

Responsive to the selectable button being selected by the user, attribute values in the column can be imported into the spreadsheet application and appropriately aligned with the entities in the table—resulting in augmenting the table with a new column that includes the above-mentioned attribute values. The table snippet can additionally include a hyperlink or button that, when selected by the user, causes more of the source table to be presented to the user or causes a browser to load a web page that comprises the source table.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 10 is an exemplary graphical user interface of a content page, wherein entities in the content page can be selected to initiate performance of a DFD search.

DETAILED DESCRIPTION

Figure 1:
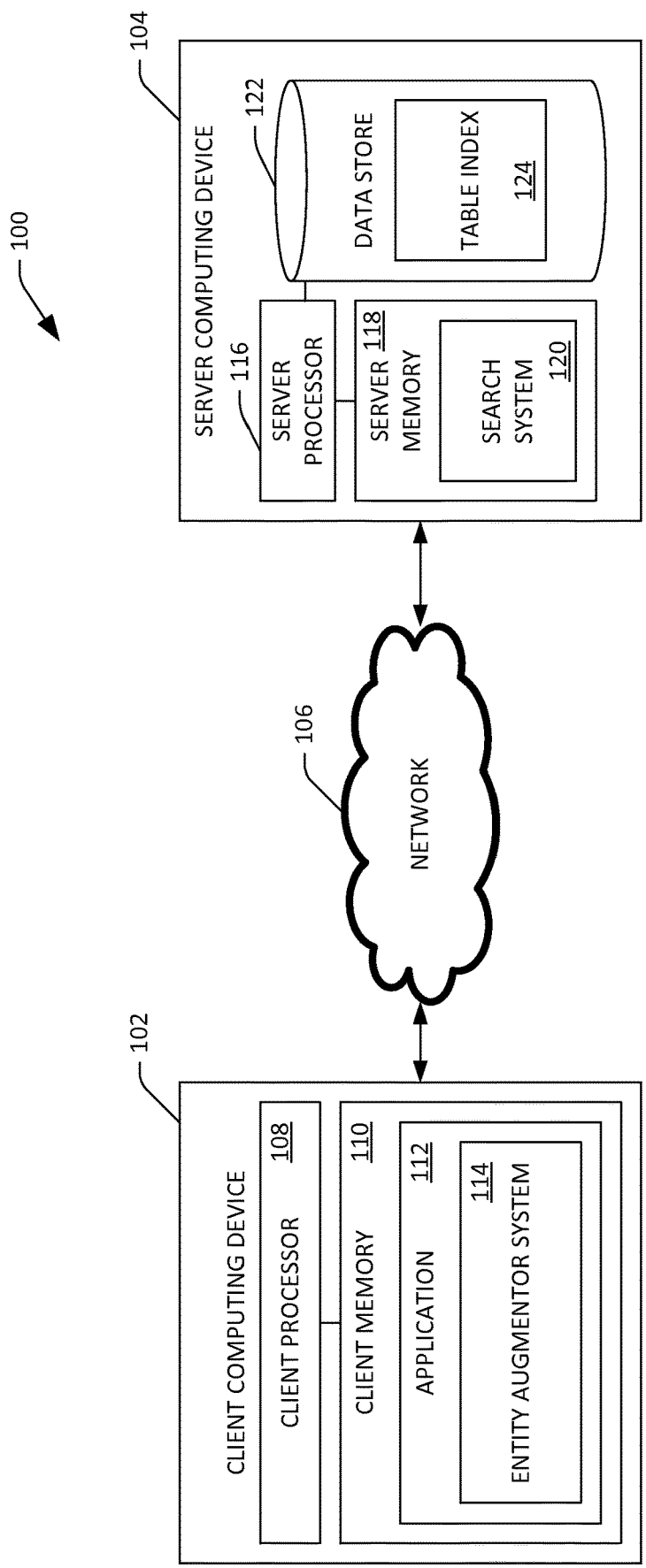
FIG. 1 is a functional block diagram of an exemplary system that is configured to perform a data finding data (DFD) search.

Various technologies pertaining to data-finding-data (DFD) searches are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference to FIG. 1, an exemplary system 100 that facilitates performance of a DFD search is illustrated. A DFD refers to a search where a query employed to perform the search is based upon data loaded into an application. Thus, in a DFD search, data loaded into an application is employed to locate related data.

The system 100 includes a client computing device 102, which can be or include a desktop computing device, a mobile computing device (such as a laptop computing device, a mobile telephone, a tablet computing device, a wearable computing device, etc.), or other suitable client computing device. The system 100 further includes a server computing device 104 that is in communication with the client computing device 102 by way of a network 106. The network 106 can be the Internet, a cellular network, etc.

The client computing device 102 includes a client processor 108 and a client memory 110, wherein the client processor 108 is configured to execute instructions loaded into the client memory 110. The client memory 110 can have an application 112 loaded therein, such that the client processor 108 can execute the application 112. In an exemplary embodiment, the application 112 can be a spreadsheet application. In another example, the application 112 can be a web browser that is configured to load a spreadsheet application. It is to be understood, however, that the application 112 is not limited to being a spreadsheet application or an application (e.g., a browser) that can load a spreadsheet application. For example, the application 112 can be a word processing application, an application that is configured to present content to a user (e.g., a news application), a dedicated e-mail application, an instant messaging application, a video game, a social networking application, etc.

The application 112 comprises an entity augmentor system 114. Briefly, the application 112 can have a plurality of entities loaded therein, and the entity augmentor system 114 facilitates retrieval of values of an attribute of the entities. With more particularity, an entity is a computer-readable string that is representative of a person, place, or thing. In a non-limiting example, the application 112 can be a spreadsheet application that has a table loaded therein, wherein a column of the table includes entities that identify countries. The entity augmentor system 114 facilitates retrieval of values of an attribute (e.g., population, average temperature, gross domestic product, etc.) of the countries.

The server computing device 104 includes a server processor 116 and a server memory 118, wherein the server processor 116 executes instructions loaded into the server memory 118. The server memory 118 can include a search system 120 that facilitates performance of a DFD search based upon a plurality of entities (and optionally an attribute) received from the entity augmentor system 114. The server computing device 104 includes or has access to a data store 122 that comprises an index 124, wherein the index 124 is a searchable index of source tables (e.g., wherein the source tables can be two-dimensional tables or multi-dimensional tables). Source tables indexed by the index 124 can be accessible by way of a network. For instance, the source tables can be tables on web pages that are accessible by way of the Internet. Thus, the search system 120 can receive a plurality of entities (and optionally an attribute) from the entity augmentor system 114, and can execute a search over the index 124 to identify a source table or source tables that are relevant to the entities. For instance, the identified source table or tables can include at least a subset of the received entities and a row or column that includes attribute values that respective correspond to the subset of the received entities.

It is to be understood that the architecture of the system 100 set forth in FIG. 1 is exemplary. For example, the search system 120 may be a portion of the application 112 loaded into the client memory 110 on the client computing device 102. In another example, the data store 122 that includes the index 124 may be local to the client computing device 102. In still yet another example, the entity augmentor system 114 can be included in the server memory 118. Still further, the entity augmentor system 114, the search system 120, and/or the index 124 can be distributed between the client computing device 102 and the server computing device 104.

Exemplary operation of the system 100 is now set forth. The application 112, loaded into the client memory 110 and executed by the client processor 108, can have a plurality of entities therein, which for example, can be displayed on a display (not shown) of the client computing device 102. For instance, the application 112 can be spreadsheet application, and the plurality of entities can be included in a column of a spreadsheet of the spreadsheet application. The user, through utilization of an input mechanism (e.g., a mouse, a touch-sensitive display, etc.) for the client computing device 102, can select the plurality of entities, and the application 112 can receive an indication that the plurality of entities have been selected. The entity augmentor system 114 can then receive an indication that a DFD search is to be conducted based upon the plurality of entities. For example, the entity augmentor system 114 can receive the plurality of entities and (optionally) an attribute that is of interest to the user.

Responsive to receiving the indication, the entity augmentor system 114 can, in an exemplary embodiment, construct a query that can be used to perform a DFD search. The entity augmentor system 114 can then cause the client computing device 102 to transmit the query to the server computing device 104 by way of the network. The query can include, for instance, the entities and the attribute selected by the user. In another example, the entity augmentor system 114 can cause the entities and the attribute (not formed as a query) to be transmitted to the server computing device 104.

The server 104 receives data from the client computing device 104, which is provided to the search system 120. When the search system 120 receives entities, which are not formatted as a query, the search system 120 can construct a query based upon the entities (and optionally the attribute specified by the user). The search system 120 searches the index 124 based upon the query. The search system 120, based upon the execution of the search over the index 124, identifies at least one source table that is relevant to the query, and is thus relevant to the entities. For example, the at least one source table can include at least a subset of the plurality of entities, known synonyms of entities in the plurality of entities, etc. Further, the at least one source table can include values of an attribute of the plurality of entities, wherein the attribute may have been specified by the user.

Responsive to identifying the at least one table, the search system 120 causes the server computing device 104 to transmit at least a portion of the source table to the client computing device 102 by way of the network 106. For example, the search system 120 can cause the server computing device 104 to transmit values of the attribute in the identified source table to the client computing device 102. The entity augmentor system 114 receives at least the portion of the source table identified by the search system 120 (e.g., the values of the attribute), and augments the plurality of entities selected by the user with the values of the attribute. For example, when the application 112 is a spreadsheet application and the entities are included in a column of a spreadsheet, the entity augmentor system 114 can add a column to such spreadsheet and populate the column with the values of the attribute, wherein the values of the attribute are appropriately aligned with their respective entities. Other examples of augmenting entities with respective attribute values corresponding thereto will be set forth below.

Figure 2:
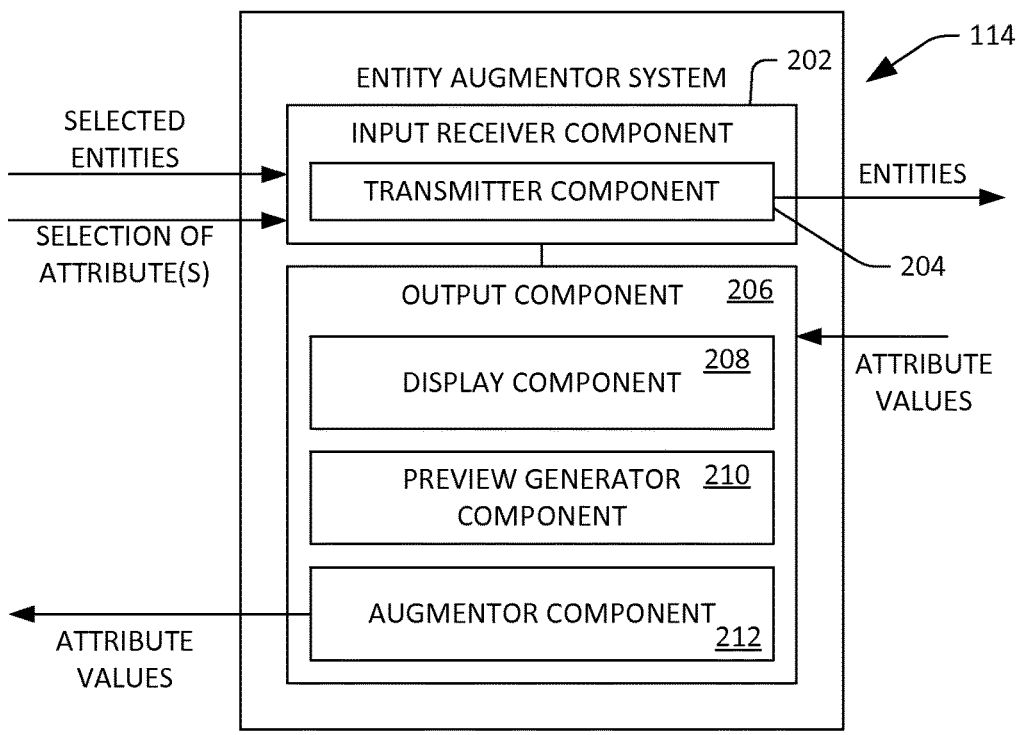
FIG. 2 is a functional block diagram of an exemplary entity augmentor system that is configured to augment identified entities with attribute values corresponding thereto.

Now turning to FIG. 2, a functional block diagram of the entity augmentor system 114 is illustrated. The entity augmentor system 114 includes an input receiver component 202 that receives a selection of a plurality of entities (e.g. from a user or a computer-executable application executing on the client computing device 102). Additionally, optionally, the input receiver component 202 can receive a selection of an attribute, wherein the entity augmentor system 114 is to retrieve values of the attribute for the respective selected entities. The input receiver component 202 can include a transmitter component 204 that transmits the selected entities and the attribute (if provided) to the server computing device 104. As indicated previously, in another exemplary embodiment, the transmitter component 204 can be configured to construct a query based upon the selected entities and attribute(s), and can be further configured to transmit the query to the server computing device 104.

The entity augmentor system 114 further includes an output component 206 that, responsive to the input receiver component 202 receiving the selection of the entities, is configured to receive values of an attribute (e.g., the attribute selected by the user) and output the values of the attribute for the selected entities. In an exemplary embodiment, the output component 206 can receive at least a portion of a source table from the search system 120, wherein the values of the attribute are included in the portion of the source table. The output component 206 includes a display component 208 that is configured to display at least the portion of the source table on a display of the client computing device 102. Display of the portion of the source table allows the user of the client computing device 102 to review contents of the source table prior to, for example, loading the attribute values of the source table into a spreadsheet.

As will be described in greater detail herein, the display component 208 can display a multitude of different parameters of the source table. In an exemplary embodiment, the display component 208 can receive a ranked list of search results generated by the search system 120, wherein the ranked list of search results includes a result that is representative of the above-mentioned source table. Pursuant to an example, the search results can include titles of respective source tables, locations of respective source tables (e.g., URL), identities of attributes in the source table, identities of entities in the source table, and the like. The display component 208, for instance, can receive an indication that the user has selected a search result that represents the source table from the ranked list of search results. Responsive to receiving such indication, the display component 208 can display more of the source table, can cause a web page that includes the source page to be loaded by a browser, etc.

The output component 206 can also include a preview generator component 210 that can generate a preview of a table identified by the search system 120 based upon the selected entities. As indicated above, the display component 208 can display a ranked list of search results that are representative of respective source tables. The preview generator component 210 can receive an indication that the user has performed a predefined action relative to a search result (e.g., such as hovering with a mouse pointer, pressing and holding with a finger, outputting a voice command). Detection of such action can cause the preview generator component 210 to display a preview of the source table represented by the search result to be presented on the display of the client computing device 102. The user of the client computing device 102 can thus quickly obtain previews of source tables represented in the ranked list of search results.

In another example pertaining to the preview generator component 210, as indicated above, the preview generator component 210 can cause a preview of a source table identified by the search system 120 to be displayed on a display of the client computing device 102. Furthermore, the preview generator component 210 can generate the preview of the source table to include controls for manipulating data shown in the preview—for instance, these controls can facilitate sorting of values in the preview of the source table by column, by row, etc. Furthermore, filtering capabilities of conventional spreadsheet applications can be enabled by the preview generator component 210.

In still yet another example, the output component 206 can receive a plurality of table snippets from the server 104, wherein the snippets summarize respective source tables identified by the search system 120 as being relevant to the entities transmitted to the server 104 by the transmitter component 204. The snippets can include, for example, data that identifies a title of a table summarized by the snippet, a location of the source table summarized by the snippet, attributes included in the source table summarized by the snippet, and a portion of the source table that is representative of the contents of such source table. It can, therefore, be ascertained that, prior to causing the application 112 on the client computing device 102 to load attribute values for presentment to the user of the client computing device 102, the user can be provided with information that assists the user in ascertaining whether the contents of the source table are trustworthy, assists the user with selecting an attribute, etc.

In yet another example, the user can select entities without identifying an attribute, and the resultant query (constructed by the entity augmentor system 114 or the search system 120) can be constructed accordingly. The search system 120 of the server 104 can identify source tables that are relevant to the entities, wherein the identified source tables include values for several different attributes (e.g., attributes occurring most often with the entities as indicated in the index 124). Identities of the several attributes can be output by the search system 120 and received by the display component 208, which surfaces the several attributes to the user (e.g., displays such attributes on a display of the client computing device 102). For instance, the display component 208 can display the attributes to indicate that the attributes are selectable (e.g., hyperlink the attributes, cause buttons to be presented in graphical relation to the attributes, etc.). The user can select at least one attribute in the displayed attributes, wherein selection of the at least one attribute is received by the input receiver component 202. The input receiver component 202 can then update the query to reflect selection of the attribute, or transmit the attribute to the search system 120, which then updates the query. The search system 120 may then search the index 124 based upon the selected entities and the selected attribute.

The output component 206 can further include an augmentor component 212 that augments the entities loaded in the application with values of the attribute selected by the user. In an example, the augmentor component 212 can cause a new column to be added to a table, and can populate the column with the values of the attribute. The augmentor component 212 aligns the attribute values with their respective entities. In another example, the augmentor component 212 can generate a page (e.g., a web page, a word processing page, or the like) that includes the entities and the values of the attribute in tabular form, such that the user of the client computing device 102 is able to identify, for an entity in the entities, the value of the attribute for the entity.

Figure 3:
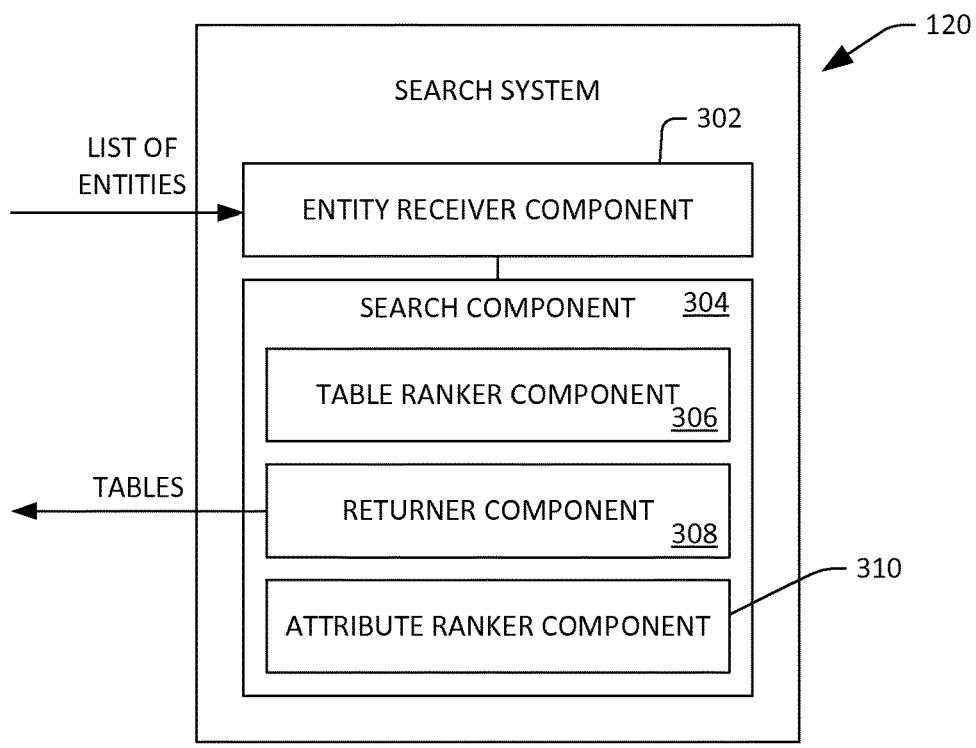
FIG. 3 is a functional block diagram of an exemplary search system that is configured to identify source tables based upon received entities.

With reference now to FIG. 3, an exemplary functional block diagram of the search system 120 is illustrated. The search system 120 includes an entity receiver component 302 that receives entities (e.g. from the transmitter component 204 of the entity augmentor system 114). Additionally, the entity receiver component 302 can receive an attribute specified by a user of the client computing device 102. Pursuant to an example, the entity receiver component 302 can construct a query that is to be executed over the index 124 responsive to receipt of the entities and (optionally) the attribute.

The search system 120 further comprises a search component 304 that is configured to search the index 124 based upon the query and return at least a portion of a source table indexed in the index 124 to the entity augmentor system 114. The search component 304 can utilize any suitable search algorithm to identify source tables related to the query.

The search component 304 includes a table ranker component 306 that ranks tables identified by the search component 304 as being relevant to the query. In an exemplary embodiment, the table ranker component 306 can rank source tables based upon coverage of source tables with respect to the selected entities (represented in the query), trustworthiness of a source where the source table is located, etc.

The search component 304 can further include a returner component 308 that returns at least a portion of a source table identified by the search component 304 and ranked by the table ranker component 306 to the entity augmentor system 114 of the client computing device 102. In an exemplary embodiment, the returner component 308 can output a ranked list of search results, wherein the search results are representative of respective source tables are ranked in accordance with a ranking output by the table ranker component 306. The ranked list of search results can include hyperlinks, table snippets, etc. Furthermore, the returner component 308 can be configured to identify most relevant portions of source tables identified by the search component 304. For example, the returner component 308 can return a portion of a source table to the entity augmentor system 114, wherein the portion of the source table includes most popular attributes, attribute values believed to be most relevant to the selected entities, (e.g., based upon data previously accessed or manipulated by a user of the client computing device 102, attribute values already existent in a table loaded into the application 112, etc.).

The search component 304 may optionally include an attribute ranker component 310 that ranks attributes in source tables identified by the search component 304 based upon the query. The attribute ranker component 310 can select and rank attributes based upon one or more of the following: 1) attributes already represented in data loaded into the application 112 on the client computing device 108; 2) trustworthiness of the source table in which values of the attribute are included; 3) popularity of the attribute (e.g., based upon a number of tables indexed in the index 124 that include the attribute), or the like. The returner component 308 can return the ranked list of attributes to the entity augmentor system 114. The ranked list of attributes can be exposed or surfaced to a user of the client computing device 102, who may then select an attribute from the ranked list of attributes. The selected attribute may be transmitted to the server computing device 104 and received by the entity receiver component 302, which can update the query based upon the selected attribute. The search component 304 can then update the search using the updated query, such that source tables that include entities in the selected entities and values of the selected attribute are identified. The table ranker component 306 ranks the source tables, and the returner component 308 may then return a ranked list of search results (which may include respective portions of the source tables represented by the search results) to the entity augmentor system 114.

Figure 4:
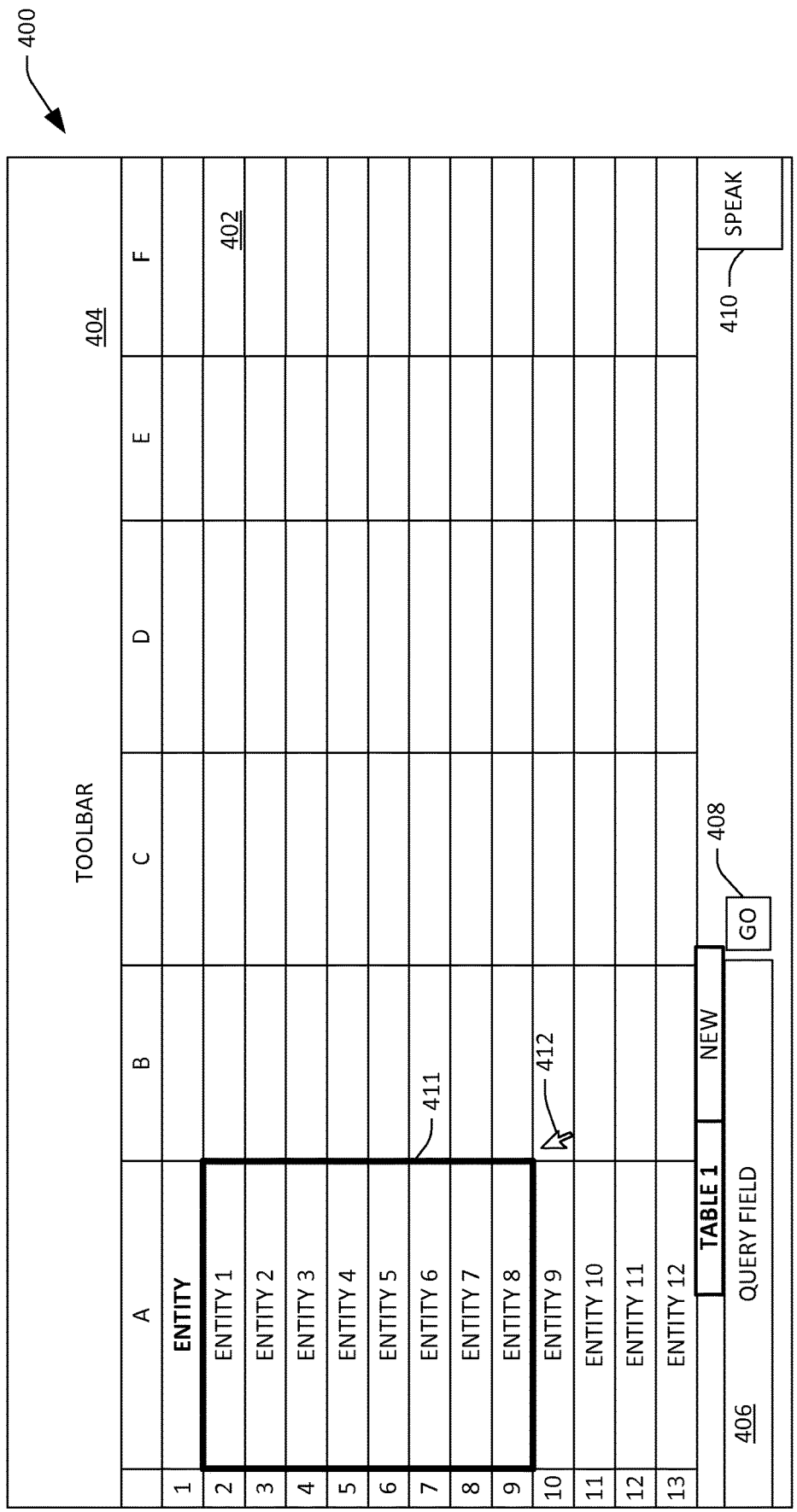
FIG. 4 is an exemplary graphical user interface of a spreadsheet application that illustrates selection of a plurality of entities in a table loaded into a spreadsheet application.

With reference collectively to FIGS. 4-12, several exemplary graphical user interfaces that facilitate performance of a DFD search are illustrated. With reference solely to FIG. 4, an exemplary graphical user interface 400 of a spreadsheet application is illustrated. Thus, in the example shown in FIG. 4, the application 112 loaded into the client memory 110 can be a spreadsheet application. The graphical user interface 400 includes a spreadsheet 402 that comprises a plurality of cells arranged in rows and columns. In the exemplary graphical user interface 400, columns A-F and rows 1-13 are depicted. It is to be understood that a graphical user interface of a spreadsheet application may depict more or fewer columns and/or rows than what is shown in the graphical user interface 400. The graphical user interface 400 also includes a toolbar 404 can include various selectable buttons, pull-down menus, data entry fields, and the like, wherein such features facilitate creating, arranging, manipulating, filtering, and displaying data included in the spreadsheet 402.

The graphical user interface 400 further includes a query field 406 that is configured to receive a query set forth by a user of the client computing device 102. A button 408, in graphical relation to the query field 406, when selected by a user of the client computing device 102, can cause a search to be performed over data based upon the query set forth in the query field 406. Pursuant to an example, the search can be performed locally (e.g., over data loaded into the spreadsheet application). In another example, a query entered into the query field 406 can identify several entities (and optionally an attribute), and can be transmitted to the search system 120 responsive to the button 408 being selected. The graphical user interface 400 further includes a button 410 that, when selected, activates a microphone of the client computing device 102 to facilitate receipt of voice input. The voice input may be a natural language query, identification of a row or column in the spreadsheet 402, identification of entities represented in the spreadsheet, etc.

The graphical user interface 400 depicts that column A comprises several entities. A plurality of entities 411 (entities in rows 1-8 of column A) are shown as being selected in the spreadsheet 402. For instance, a cursor 412 can be employed to select the plurality of entities 411. In another example, a gesture over a touch sensitive display can be employed to select the plurality of entities 411. In still yet another example, the plurality of entities 411 can be selected via voice input (submitted responsive to selection of the button 410). In another example, the plurality of entities 411 can be selected by way of entry of a query into the query field 406.

Figure 5:
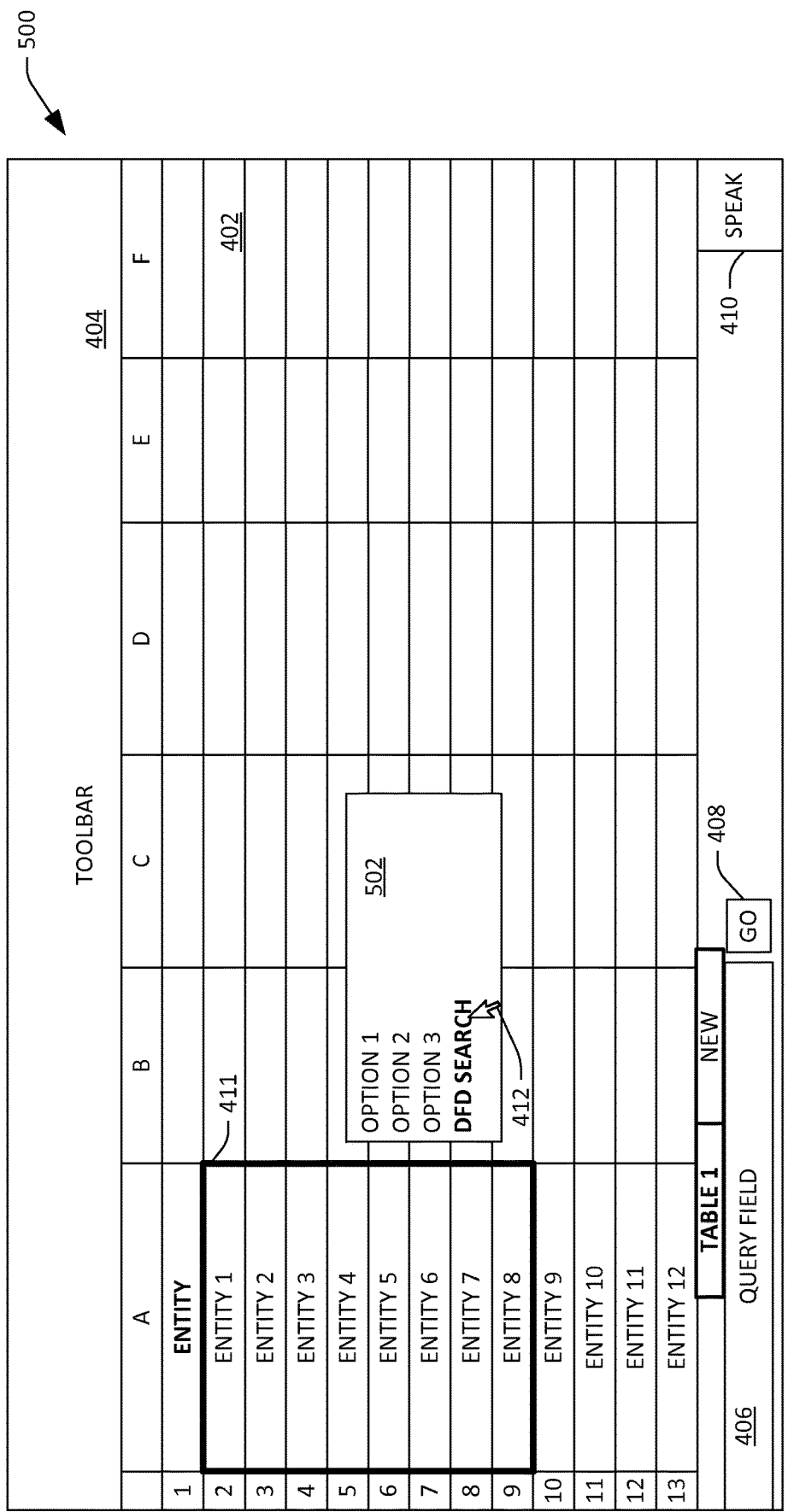
FIG. 5 is an exemplary graphical user interface of a spreadsheet application that facilitates initiation of a DFD search based upon selected entities.

Referring now to FIG. 5, an exemplary graphical user interface 500 that facilitates performance of a DFD search based upon the selected entities 411 is illustrated. The user of the client computing device can set forth a command (e.g., a right-click, a gesture, a spoken command, etc.) that indicates that a DFD search is to be performed based upon the selected entities 411. The input receiver component 202 can receive such input and cause, for example, a pop-up window 502 to be displayed on a display of the client computing device 102 responsive to receipt of the command. The pop-up window 502 can include several selectable options, wherein one of the options can initiate a DFD search. The option for initiating the DFD search can be selected by way of the cursor 412, by way of a touch on a touch-sensitive display, a voice command, etc. Responsive to the input receiver component 202 receiving the selection of the DFD option shown in the pop-up window 502, the transmitter component 204 can transmit the selected entities 411 to the search system 120 (or construct a query based upon the selected entities 411 and transmit the query to the search system 120). In this example, the user has not specified an attribute. It is to be understood, however, that mechanisms that facilitate receipt of a user-specification of an attribute are contemplated. For example, user can specify the attribute in the query field 406, the popup window 502 may include a field for specifying the attribute, etc.

Figure 6:
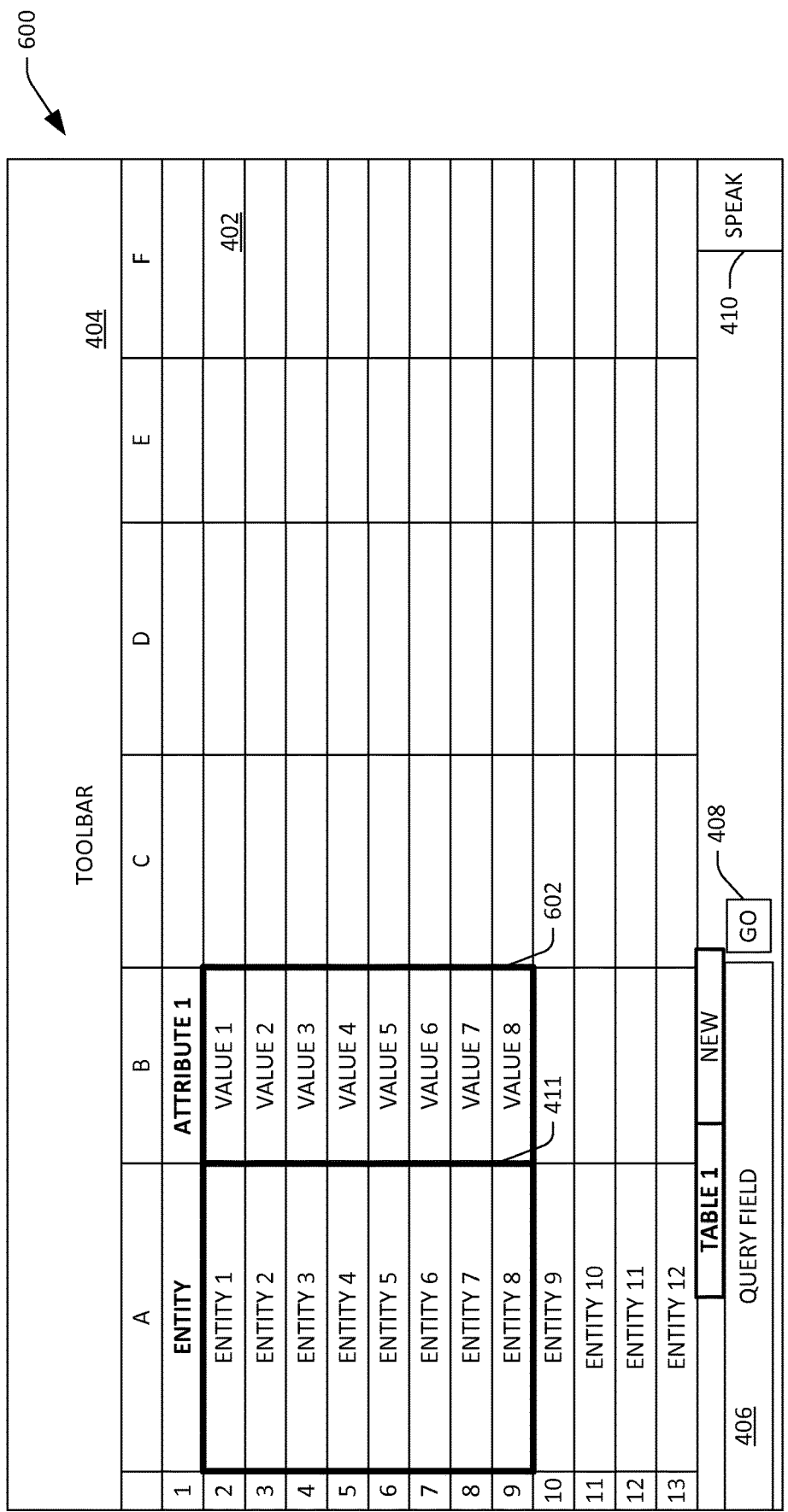
FIG. 6 is an exemplary graphical user interface of a spreadsheet application that illustrates augmentation of entities with attribute values.

Referring now to FIG. 6, a graphical user interface 600 is depicted that illustrates augmentation of the entities 411 with attribute values. As described above, the search system 120 searches the index 124 based upon the query (which is constructed based upon the entities 411 and a specified attribute), and can return values 602 of the attribute to the entity augmentor system 114. The augmentor component 212 can augment the spreadsheet 402 with the values 602 of the attribute by populating cells in column B of the spreadsheet 402 with the values 602 of the spreadsheet, appropriately aligned with the entities. Thus, "VALUE 1" is the value of the attribute for "ENTITY 1", "VALUE 2" is the value of the attribute for "ENTITY 2", and so on.

In the above-described example, the augmentor component 212 automatically populates the cells in column B with the values 602 of the attribute (e.g., the user has not reviewed and approved the values 602 prior to the values 602 being imported into the spreadsheet 402). If the user disapproves of the values 602 of the attribute, the user can set forth an "undo" command and cause a more refined search to be performed by the search system 120. Furthermore, in an example, the user need not specify the attribute. Rather, the search system 120 can automatically identify the attribute. For instance, the search system 120 can determine that "ATTRIBUTE 1" is the most popular attribute related to the selected entities 411 (e.g., based upon a number of tables indexed in the index 124 that include both entities in the selected entities 411 and "ATTRIBUTE 1"). The search component 304 can select such attribute without user feedback and transmit values for such attribute to the entity augmentor system 114, and the augmentor component 212 can augment the spreadsheet 402 with the attribute values responsive to receipt of such values.

To facilitate augmenting the spreadsheet with the values 602, the search component 304 and/or the augmentor component 212 can perform an integrated fuzzy-joined column import. Specifically, the search component 304 and/or the augmentor component 212 can perform a fuzzy join between 1) the selected entities 411 in the spreadsheet; and 2) a column of the source table identified by the search component 304 that includes a least a subset of the selected entities 411. In an exemplary embodiment, such fuzzy join can be robust to spelling mistakes in different syntactic and semantic representations of the entities (either in the selected entities 411 or in the source table). For instance, the semantic synonyms may be retrieved from a separate device providing such synonymous entities. The search component 304 and/or the augmentor component 212 may also include syntactic transformation rules that are available when performing the fuzzy join. This fuzzy join allows for entities in source tables to be appropriately mapped to the selected entities 411, and thus appropriate attribute values to be mapped to the selected entities 411.

Figure 7:
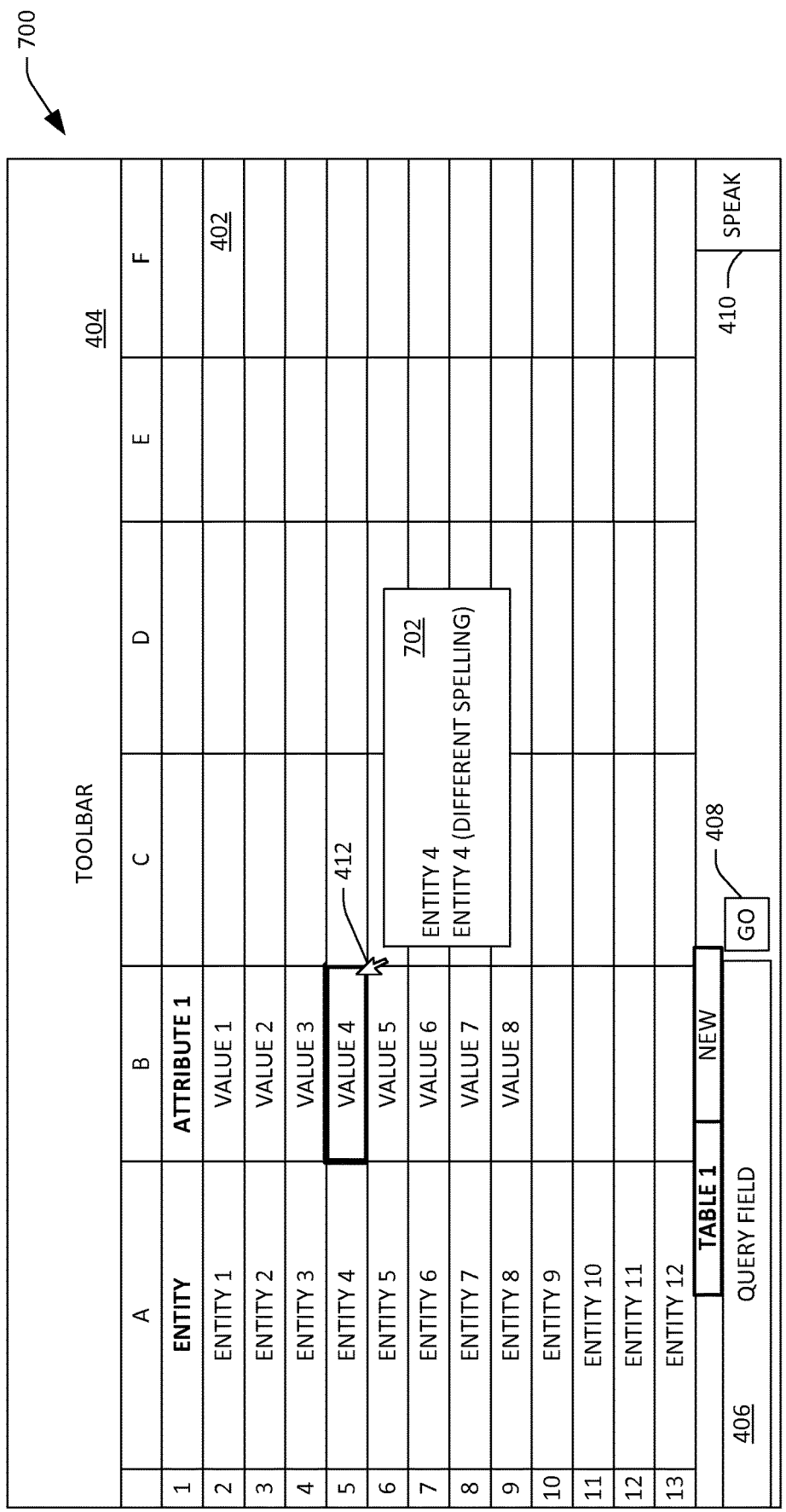
FIG. 7 is an exemplary graphical user interface of a spreadsheet application that illustrates exemplary data that can be presented responsive to a cell in a spreadsheet being hovered over by a mouse pointer.

Now referring to FIG. 7, another exemplary graphical user interface 700 of the spreadsheet application is depicted. As shown in the graphical user interface 700, a user selects an attribute value from column B that was retrieved during the DFD search. For instance, the cursor 412 can be hovered over cell B5, which includes "VALUE 4" for "ENTITY 4". Responsive to the user hovering over the cell, information pertaining to the attribute value in the cell can be presented. For example, identity of the source table from which the attribute value was obtained can be presented in a pop-up window 702 responsive to the cursor 412 being hovered over cell B5. Further, the popup window 702 can display an identity of the entity in the source table that corresponds to "VALUE 4. This can indicate that the entity in the selected entities 411 is spelled differently in the source table. In an example, the entity in cell A5 may be "Company", while the corresponding entity in the source table may be spelled "CMPNY." Based upon the information in the pop-up window 702, the user of the client computing device 102 can verify correctness of the fuzzy join, correctness of individual attribute values, etc.

Figure 8:
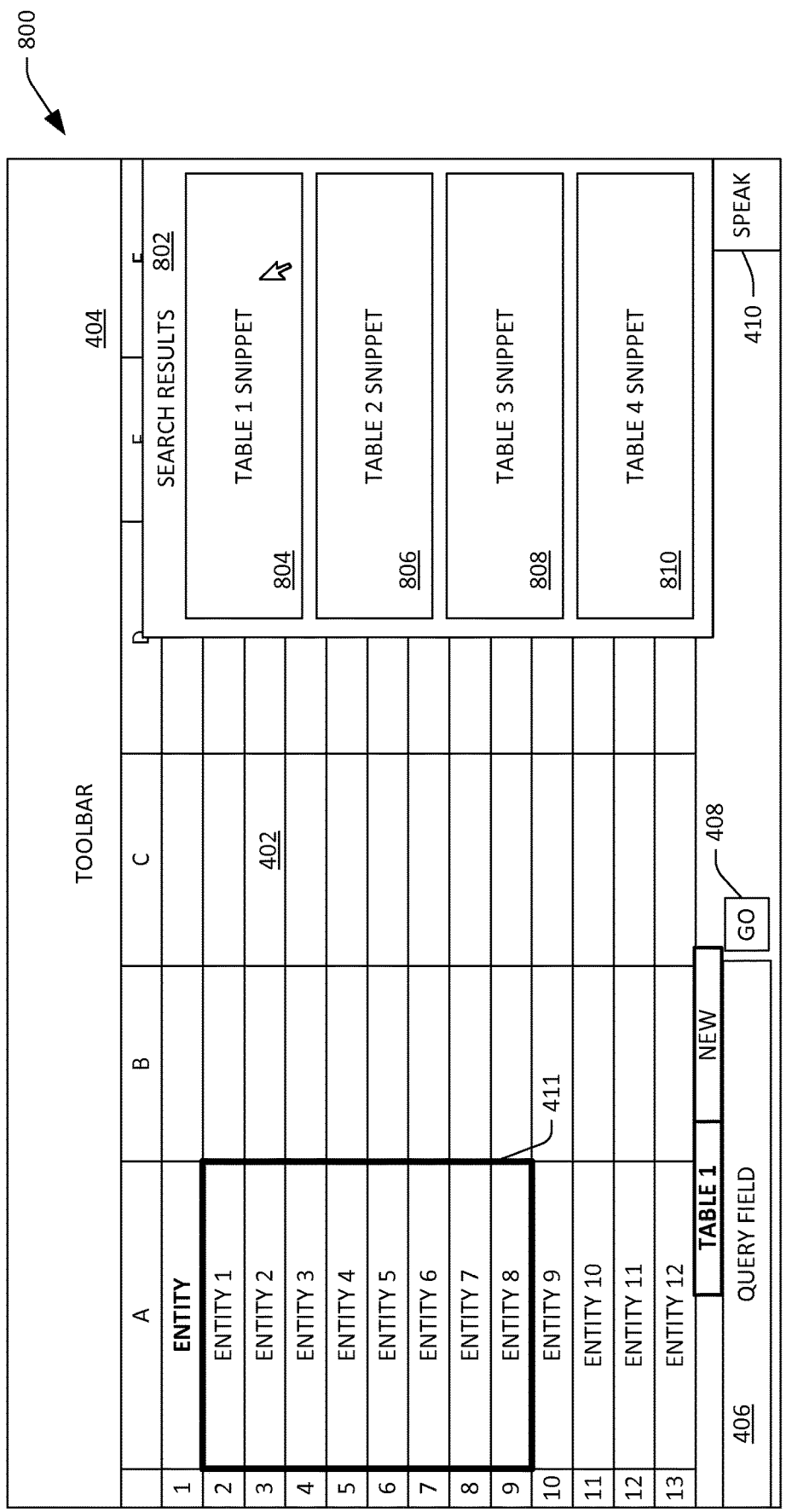
FIG. 8 is an exemplary graphical user interface of a spreadsheet application that illustrates presentment of table snippets on a display, wherein the table snippets summarize respective source tables that include attribute values related to selected entities.

With reference now to FIG. 8, an exemplary graphical user interface 800 of the spreadsheet application is displayed. The graphical user interface 800 sets forth a depiction of data that can be presented on a display of the client computing device 102 responsive to a DFD search being conducted. The search system 120 returns search results 802 for presentment in the graphical user interface 800, and the display component 208 displays the search results 802 on the display of the client computing device 102. As indicated above, the search results 802 may include a ranked list of search results, wherein the search results are representative of source tables that have been identified by the search system 120 as being relevant to a query (where the query is based upon the selected entities 411 and optionally at least one attribute specified by the user).

For instance, the search results 802 can be displayed in a manner similar to conventional web search results, where the search results 802 include hyperlinks to source tables respectively represented by the search results. Selection of a hyperlink can, for example, cause a web browser to load the web page that includes the source table. In another example, selection of the hyperlink can cause the preview generator component 210 to display a preview of the source table represented by the corresponding search result in the graphical user interface 800. While not shown, the search results 802 can have a scrollbar associated therewith that facilitates "infinite" scrolling. Thus, the user scrolls to be provided with additional search results, rather than requesting new pages of search results. In the exemplary graphical user interface 800, the search results 802 can include a plurality of ranked table snippets 804-810. The table snippets 804-810 respectively summarize source tables identified by the search system 120.

Figure 9:
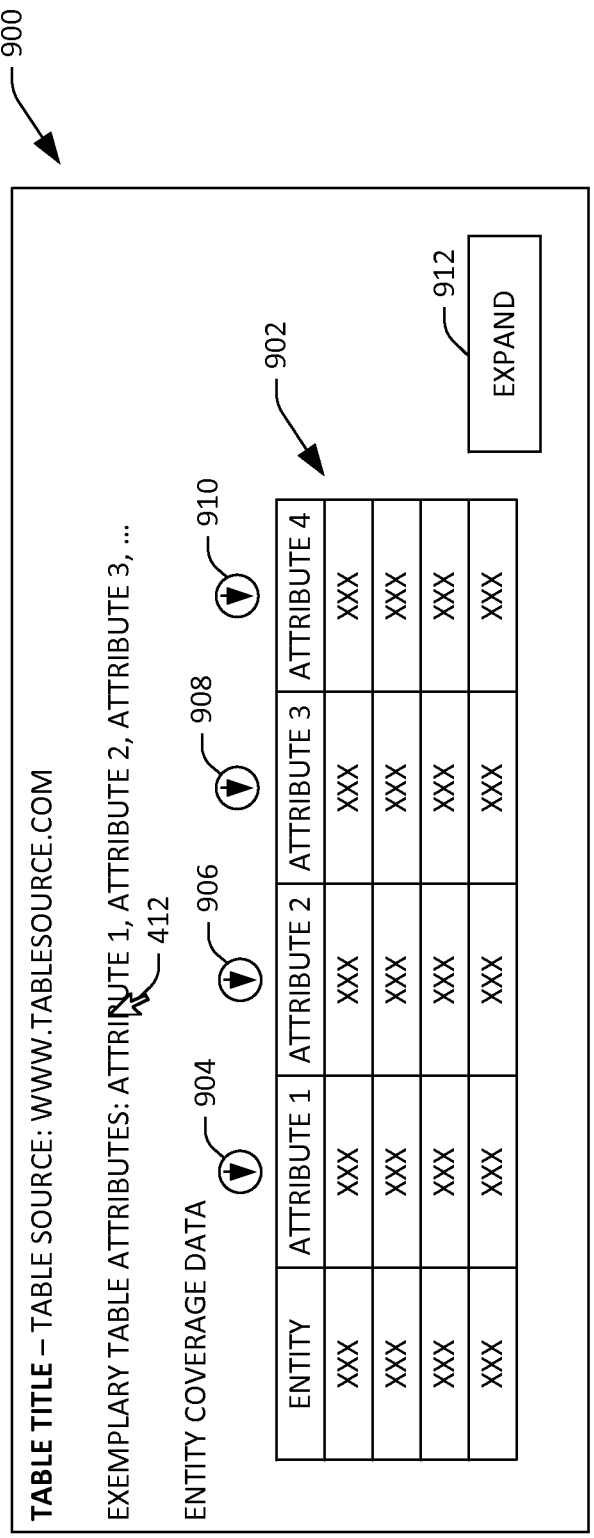
FIG. 9 illustrates an exemplary table snippet.

Now referring to FIG. 9, an exemplary table snippet 900 that can be included in the search results 802 is illustrated. The table snippet 900 can include, but is not limited to including: 1) a source table title; 2) a location of the source table summarized by the table snippet 900 (e.g., a URL where the table can be acquired); 3) attributes having attribute values in the source table summarized by the table snippet 900 (e.g., a threshold number of most popular attributes, a threshold number of attributes believed to be most relevant to the selected entities 411, and/or attributes submitted by the user of the client computing device 102); 4) entity coverage data, wherein the entity coverage data is indicative of a number of entities in the selected entities 411 that are also included in the source table summarized by the table snippet 900; and 5) a sample portion 902 of the source table summarized by the table snippet 900, wherein the sample portion 902 of the source table includes a subset of rows and/or columns of the source table that can provide the user of the client computing device 102 with information about why the search system 120 identified the source table based upon the selected entities 411. For instance, rows and/or columns can be included in the portion 902 that comprise entities in the selected entities 411 and/or attribute values for such entities.

It is to be understood that the rows and/or columns in the portion 902 of the source table may be arranged in a differently when compared to the source table itself. That is, the search system 120 can generate the table snippet 900 to appear to correspond to the arrangement of entities in the spreadsheet loaded in the client computing device 102. Accordingly, the user of the client computing device 102 can relatively quickly visually ascertain why the search system 120 returned the source table summarized by the snippet 900, and can further visually ascertain if it is desirable to augment the spreadsheet 402 with attribute values in the source table summarized by the snippet.

In an exemplary embodiment, the attributes listed in the table snippet 900 can be selectable. Upon receipt of a selection of an attribute, the table snippet 900 can be updated such that the portion 902 highlights values of the attribute relative to entities (e.g., entities included in the source table that are also included in the selected entities 41). In another example, selection of an attribute can cause the query to be refined, and the search system 120 to perform an updated search over the index 124.

Furthermore for each row and/or column of the portion 902 of the source table summarized by the table snippet 900, a respective graphical object can be presented, wherein selection of such graphical object can cause the augmentor component 212 to augment the spreadsheet 402 with values of the attribute in the respective row and/or column. For example, the portion 902 of the source table illustrated in the table snippet 900 includes five columns: a first column that is representative of entities in the source table summarized by the table snippet 900; and four columns that are representative of respective attributes of the entities. Each of the four attribute columns can include a respective selectable graphical object. Thus, the table snippet 900 includes selectable graphical objects 904-910 corresponding to the four attribute columns. In an example, responsive to receipt of a selection of the graphical object 904, attribute values, of the attribute "ATTRIBUTE 1", of entities in the selected entities 411 can be loaded into the spreadsheet 402 and graphically depicted in relation to the selected entities 411 (for example, as shown in the graphical user interface 600 of FIG. 6). That is, a column of the spreadsheet 402 can be newly populate is an attribute column for "ATTRIBUTE 1", where the column is populated by attribute values.

The table snippet 900 may also include an expand button 912 that, when selected, may cause an entirety of the source table summarized by the snippet 900 to be presented on the display of the client computing device 102 (e.g., in the spreadsheet application, in a web browser, in a word processing document, etc.) into For example, the source table can be loaded into a new spreadsheet of the spreadsheet application. In another example, the search results 802 can be replaced with the table summarized by the table snippet 900. Further, while not shown, the table snippet 900 can include a search button that is configured to cause the search system 120 to identify source tables similar to the source table summarized by the table snippet 900. The search system 120 may then provide search results that are based upon the source table summarized by the table snippet 900 (and optionally, further based upon the selected entities 411 and an attribute set forth by the user of the client computing device 102).

Moreover, while not shown, the table snippet 900 can support hit highlighting. With more particularity, a table represented by the table snippet 900 is retrieved based upon a query, wherein the query includes keyword(s). The keywords, where included in the table snippet 900, can be highlighted to indicate where in the table represented by the table snippet 900 the keywords occur. The locations can be in the title, the URL, the subset of the table that is included in the snippet 900, etc.

With reference now to FIG. 10, another exemplary graphical user interface 1000 that facilitates performance of a data finding data search. The exemplary graphical user interface 1000 can be presented by an application executed by the client computing device 102 other than a spreadsheet application. For example, the graphical user interface 1000 may be for a word processing application, a text editing application, an e-mail application, a social networking application, an instant messaging application, a news application, a slide presentation application, or other suitable application that can present content on a page. As indicated, the content on the page includes several entities 1001 (e.g., separated by delimiters). Any suitable selection mechanisms can be employed to select the entities 1001 (e.g., entities 1-6) of the content of the content page. For example, the user of the client computing device 102 can highlight the entities 1001 through utilization of the cursor 412. In another example, the user can select the entities 1001 by way of a voice command, a gesture, or the like. The user may then set forth an indication that a data finding data search is to be employed based upon the selected entities 1001 (and optionally, a provided attribute). Again, this indication can be received by, for instance, right-clicking on the selected entities 1001, which causes a pop-up window 1002 to be presented on a display of the client computing device 102.

One of the options in the pop-up window 1002 can be to perform a DFD search based upon the selected entities 1001, and such option can be selected by way of any suitable selection mechanism. The selected entities 1001 (or a query constructed based upon the selected entities 1001) can then be transmitted to the search system 120, which can return search results, attribute values, etc., in a manner similar to what has been described above. In an exemplary embodiment, the search system 120 can cause a new page to be constructed (e.g., a web page, a word document, etc.) and can cause the new page to be transmitted to the client computing device 102, wherein the resultant page includes a table that comprises the selected entities 1001 and corresponding attribute values identified by the user and/or the search system 120. In another example, responsive to receipt of attribute values for the selected entities 1001 from the search system 120, a spreadsheet application can be initiated at the client computing device 102 and populated with the selected entities 1001 and attribute values corresponding thereto. In such an embodiment, the user can identify a table of interest on a web page, can select entities in the table of interest, initiate performance of a DFD search using the selected entities (and optionally an attribute), and cause a table to be automatically generated in a spreadsheet application based upon the DFD search (where the table includes the entities selected by the user and attribute values from another table identified by the search system 120 and approved by the user).

Figure 11:
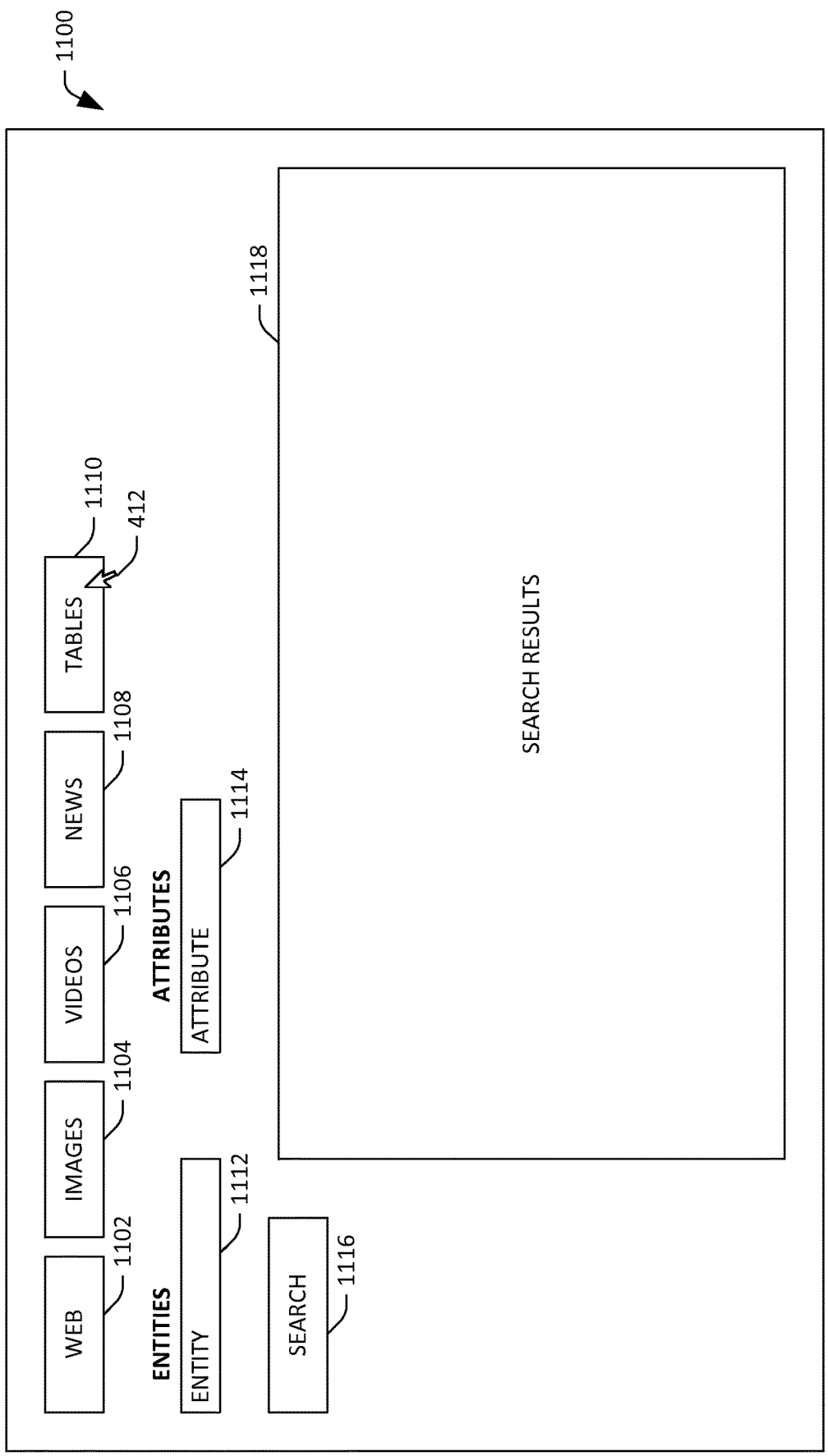
FIG. 11 is an exemplary graphical user interface of a search engine vertical that facilitates performance of a DFD search.

With reference now to FIG. 11, another exemplary graphical user interface 1100 is depicted. The graphical user interface 1100 can be a graphical user interface for a search engine (e.g., a particular vertical of a search engine). For example, the search engine may include a plurality of verticals, which can be represented by selectable graphical objects in the graphical user interface 1100. The exemplary verticals can be "WEB", "IMAGES", "VIDEOS", "NEWS", and "TABLES" represented by selectable objects 1102-1110. The "WEB" vertical facilitates performance of conventional web searches, the "IMAGES" vertical facilitates performance of searches for images, the "VIDEOS" vertical facilitates performance of searches for videos, and so forth.

In the exemplary graphical user interface 1100, the user has selected the graphical object 1110 with the cursor 412, such that the "TABLES" vertical has been selected. The "TABLES" vertical can include at least two fields that can be populated: 1) a first field 1112 that is configured to receive an entity or entities specified by the user; and 2) a second field 1114 that is configured to receive an attribute or attributes of the entity or entities entered into the first field 112. As indicated, the user can enter multiple entities into the field 1112, separated by delimiters (e.g., semicolons or other suitable delimiters). Likewise, the user can set forth multiple attributes in the field 1114, separated by delimiters. A search button 1116 in the graphical user interface 1100 may then be selected, which causes the transmitter component 204 to transmit the entities and attributes in the fields 1112 and 1114, respectively, to the search system 120 (or which causes the entity augmentor system 114 to construct a query based upon the entities and attributes and transmit the query to the search system 120). The search system 120 can execute a DFD search in the manner described above.

The search system 120 may then return search results, which can be displayed in a search results field 1118. The search results shown in the field 1118 may be portions of source tables identified as including at least one entity set forth in the field 1112 and at least one value of the attribute set forth in the field 1114. In another example, the search results in the search results field 1118 can include data extracted from multiple tables that are joined together to form a final result that can be relatively quickly consumed by the user. For example, a first source table may include a first entity specified in the field 1112 and have an attribute value for the attribute specified in the field 1114, while a second source table may include a second entity specified in the field 1112 and a value for the attribute specified in the field 1114. The search system 120 can identify the first source table and the second source table, select appropriate entries from each of the two source tables, and create a search result that is based upon the combination of the first source table and the second source table. The information need of the user is met by the combination included in the search result.

Figure 12:
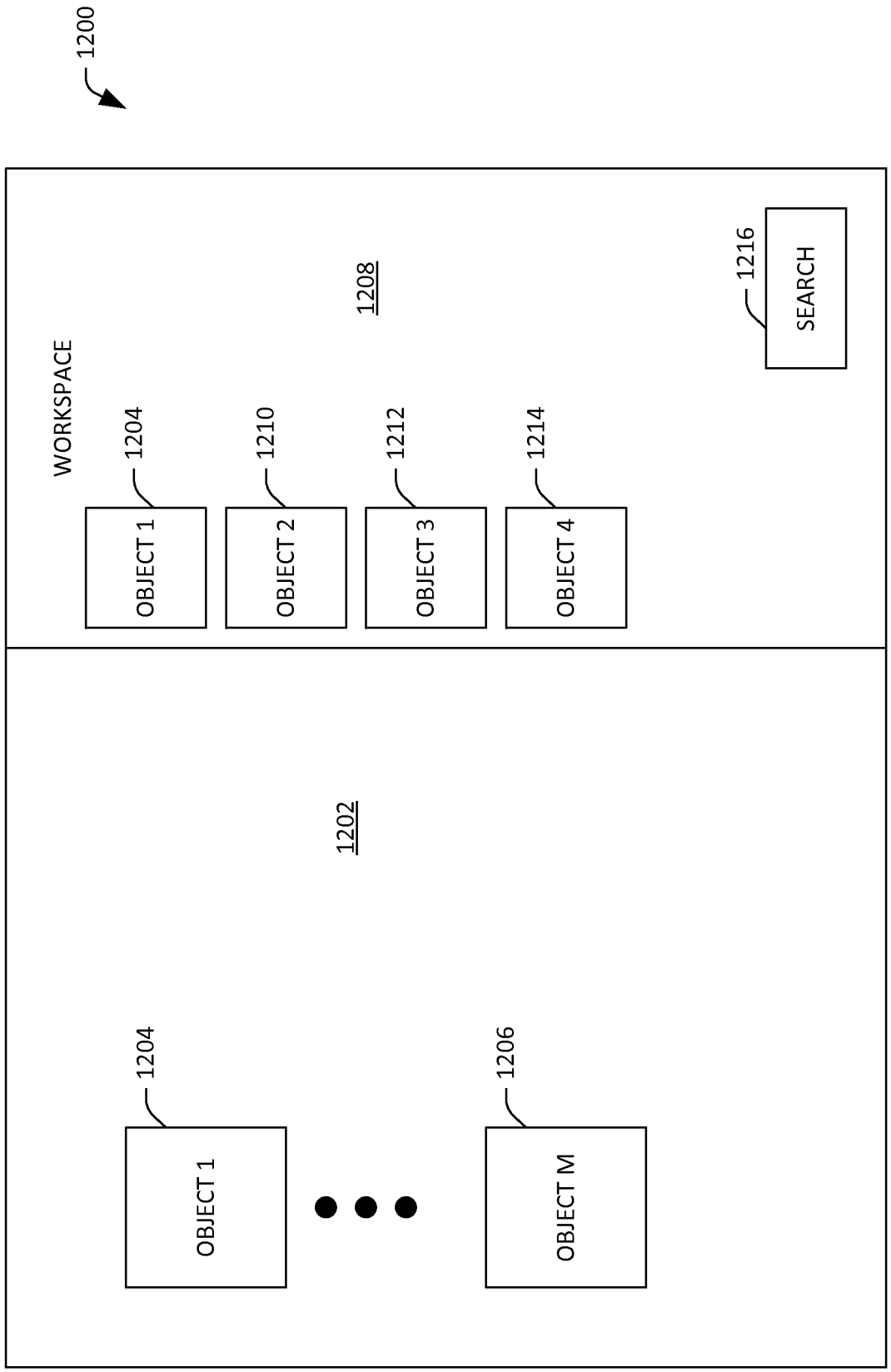
FIG. 12 illustrates an exemplary graphical user interface that facilitates performance of a DFD search by way of dragging and dropping graphical objects that are representative of people, places, or things.

Now referring to FIG. 12, another exemplary graphical user interface 1200 is illustrated that facilitates performance of a DFD search. The graphical user interface 1200 includes a first portion 1202 that can include a plurality of selectable objects 1204-1206. For example, such objects 1204-1206 may be included on a web page, wherein the objects 1204-1206 can represent purchasable items. The user may scroll through the objects 1204-1206, select an object or objects by way of a suitable selection mechanism, and drag the selected object(s) to a workspace field 1208. In the exemplary graphical user interface 1200, the user has selected the object 1204, as well as three additional objects 1210-1214. The workspace field 1208 may include a search button 1216 that, when selected by the user, causes the transmitter component 204 to transmit the entities in the workspace field 1208 to the search system 120, which executes a search over the index 124 based upon the entities, as described above. Search results may be presented in the workspace field 1208 or on another content page.

While the graphical user interfaces depicted in FIGS. 4-12 provide various examples, it is be understood that numerous variants are contemplated. For example, while the graphical user interface 1100 depicts two fields for initiating performance of a DFD, it is to be understood that a DFD search may be initiated through utilization of a single field (e.g., the query field 406, the field 1112, etc.). In such an example, a keyword query may be entered into the single field, and the search system 120 can return a ranked list of tables based upon the keyword query. The query set forth in the field may include implicit structure, and there may be certain classes of queries for which the search system 120 is optimized. For example, structures that are exemplary include a pure keyword query, an entity only query, a multiple entity query, a concept query, an entity-attribute query, and the like.

Further, while the graphical user interface 700 depicted in FIG. 7 illustrates data that can be presented upon selecting a cell, it is be understood that user may wish to obtain information about a particular column. For instance, the cursor 412 can be employed to hover over the "B" column in the graphical user interface 700, which may cause the pop-up window 702 to present metadata about the column, such as column synonyms. Such synonyms may be existent in source tables indexed in the index 124.

In yet another example, the exemplary table snippet 900 has been described as including the graphical objects 904-910, wherein when one of the graphical objects 904-910 is selected, attribute values in the column of the selected object are appended to a table in a loaded spreadsheet. In another example, however, a drag-and-drop approach to append data is contemplated, wherein the user selects a particular column or cell values in the table snippet 900 (or expanded table), drags the column or cell values into the spreadsheet 402 loaded by the spreadsheet application at a desired location, and drops the column or cell values in at a desired position(s). When the drag and drop of attribute values is performed, the attribute values can be automatically arranged to correspond to the appropriate entities.

Further, an embodiment has been described herein where the search system 120 returns a ranked list of attributes. In another example, rather than being provided with attributes in list form, the display component 208 can display a tag cloud of attributes for the selected entities 411, where the attributes (or key words from attributes) for the entities 411 are included in the tag cloud. The attributes in the tag cloud can be sized in proportion to the number of identified source tables that comprise the attribute name and/or keywords from the attribute names (in the case of an entity-attribute query). Other examples will be readily recognized.

FIGS. 13-17 illustrate exemplary methodologies relating to DFD searches. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 13:
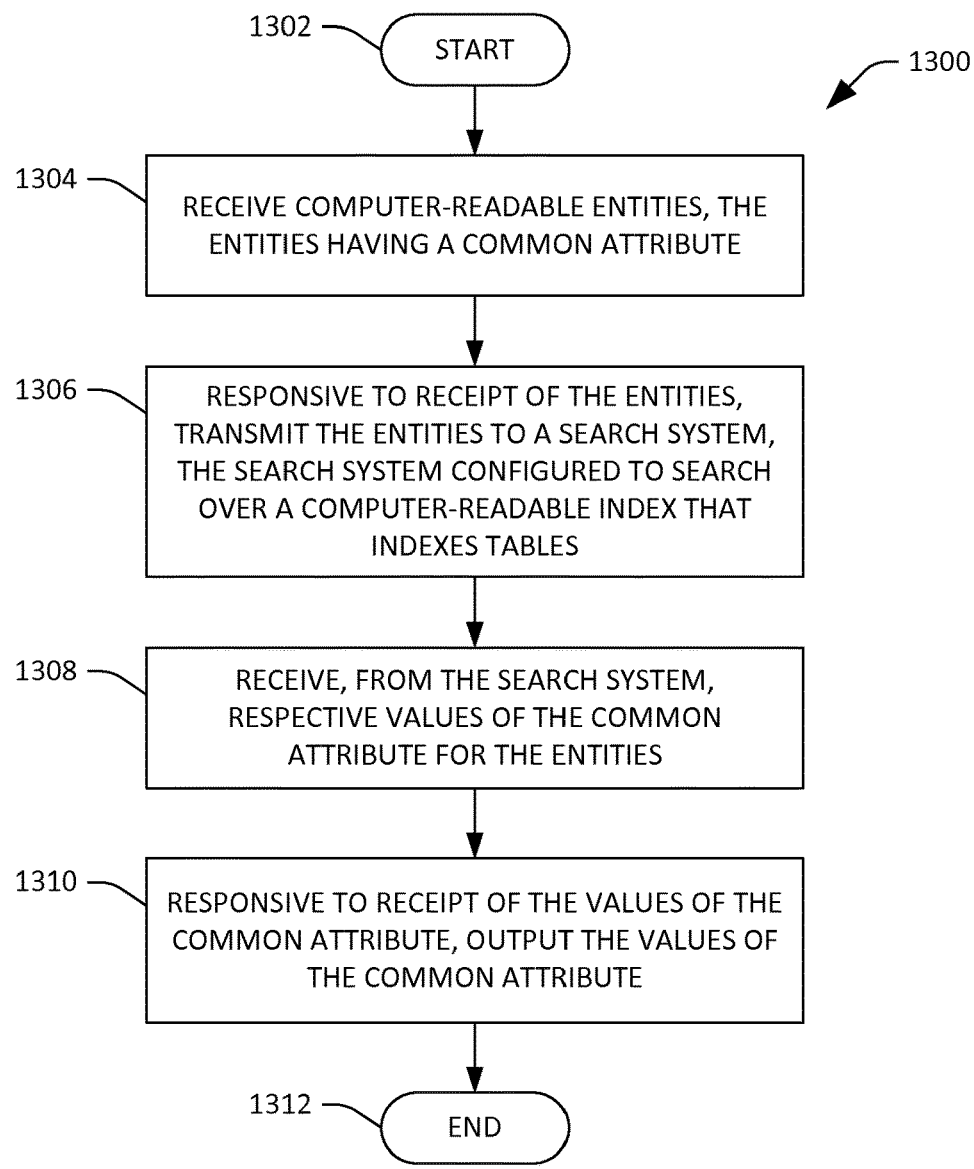
FIG. 13 is a flow diagram that illustrates an exemplary methodology for performing a DFD search.

Now referring to FIG. 13, an exemplary methodology 1300 that facilitates performance of a DFD search is illustrated. The methodology 1300 starts at 1302, and at 1304 computer readable entities are received, wherein the computer readable entities have a common attribute. In an example, the computer-readable entities can be received responsive to a user selecting the entities by way of a suitable selection mechanism. At 1306, responsive to receiving the entities, the entities are transmitted to a search system. As indicated above, the search system is configured to search over an index that indexes source tables, wherein the search is based upon the entities.

At 1308, values of the common attribute are received from the search system, wherein the values respectively correspond to the received entities. At 1310, responsive to receiving the values of the common attribute, the values of the common attribute are output. For example, the values of the common attribute can be presented as a portion of a search result. In another example, the values of the common attribute can be appended to a table that includes the entities, wherein the values of the attribute are arranged in the table to respectively appropriately correspond to the entities. The methodology 1300 completes at 1312.

Figure 14:
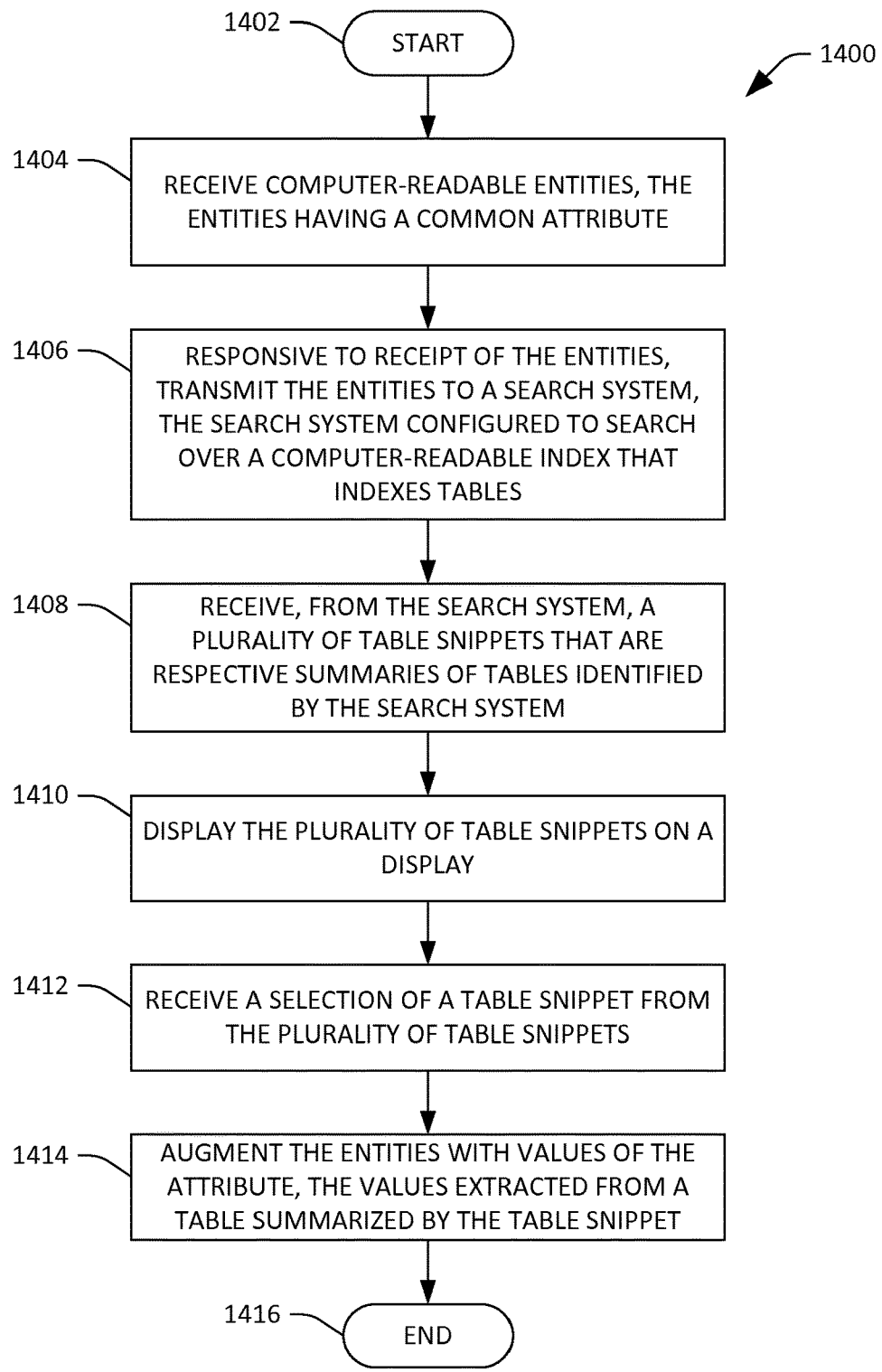
FIG. 14 is a flow diagram illustrating an exemplary methodology for augmenting a table that includes a plurality of entities with respective values of an attribute of the entities.

Now referring to FIG. 14, an exemplary methodology 1400 that facilitates augmenting tabular data with attribute values retrieved based upon a DFD search is illustrated. The methodology 1400 starts at 1402, and at 1404 a plurality of computer readable entities are received, wherein the entities share an attribute. At 1406, responsive to receiving the entities, the entities are transmitted to a search system, wherein the search system is configured to search over an index of computer-readable source tables. At 1408, a plurality of table snippets are received from the search system, wherein the table snippets are respective summaries of source tables identified by the search system. At 1410, the plurality of table snippets are displayed on the display. At 1412, a selection of a table snippet is received from the plurality of table snippets, and at 1414 the entities are augmented (enriched) with values of the attribute, wherein the values are extracted from a source table summarized by the table snippet and are retrieved based upon the selection of the table snippet at 1412. The methodology 1400 completes at 1416.

Figure 15:
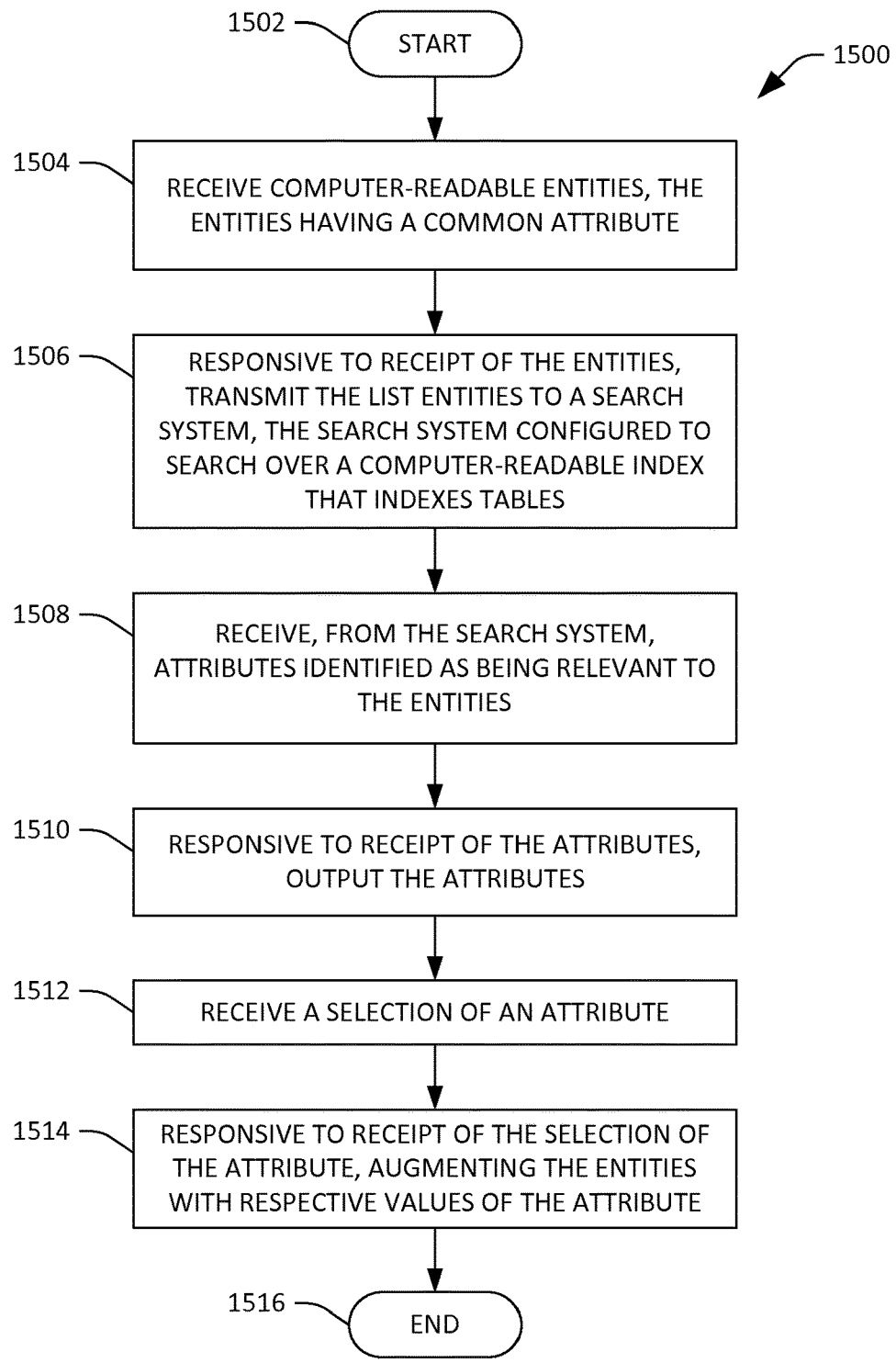
FIG. 15 is a flow diagram that illustrates an exemplary methodology for presenting a ranked list of attributes on a display, wherein the ranked list of attributes are found to be relevant to a plurality of identified entities.

Now referring to FIG. 15, an exemplary methodology 1500 that facilitates augmenting entities with attribute values based upon selection of an attribute in a ranked list of attributes (or a tag cloud of attributes) is illustrated. The methodology 1500 starts at 1502, and at 1504 entities are received, wherein the entities have a common attribute. At 1506, responsive to receiving the entities, the entities are transmitted to a search system that is configured to search over an index of computer readable tables. At 1508, attributes are received from the search system, wherein the attributes are identified as being relevant to the entities received at 1504. In an example, the attributes can be received as a ranked list of attributes, as a tag cloud of attributes, etc. For example, the attributes can be attributes that most commonly occur in source tables (indexed by the index) that include the entities received at 1504.

At 1510, responsive to receiving the attributes, the attributes are output. At 1512, a selection of an attribute is received (e.g., a user selects an attribute of interest), and at 1514, responsive to receiving the selection of the attribute, the entities are augmented with respective values of the attribute. With more particularity, selection of the attribute can cause the attribute to be transmitted to the search system, which utilizes the attribute and the received entities to locate attribute values in source tables indexed by the index. The attribute values can then be returned and confirmed by the user, and tabular data can be augmented with the attribute values. The methodology 1500 completes at 1516.

Figure 16:
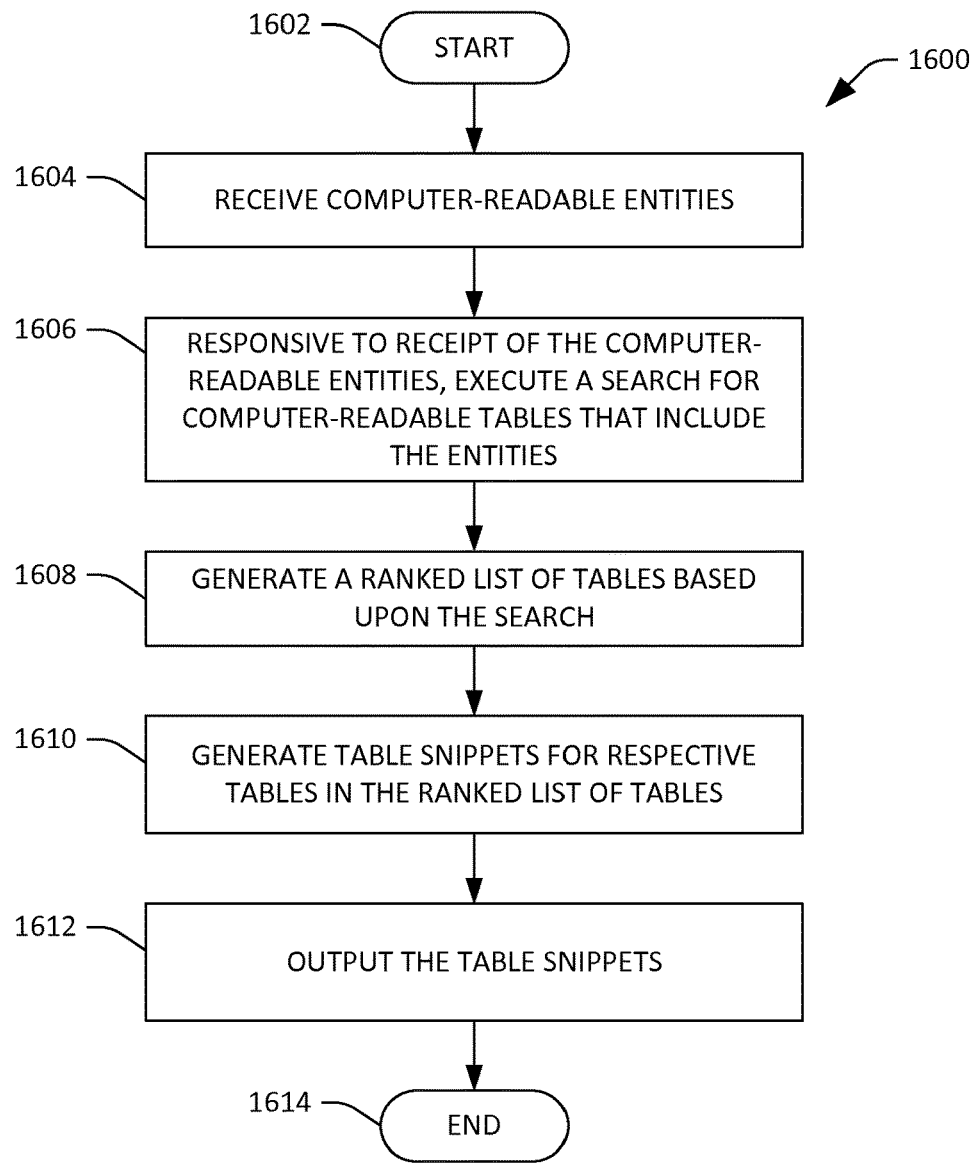
FIG. 16 is a flow diagram that illustrates an exemplary methodology for generating table snippets that respectively summarize source tables found to be relevant to selected entities.

Now referring to FIG. 16, an exemplary methodology 1600 that facilitates dynamic generation of table snippets is illustrated. The methodology 1600 starts to 1602, and at 1604 computer-readable entities are received. At 1606, responsive to receiving the computer-readable entities, a search for computer-readable source tables is executed based upon the entities. That is, source tables are located that include the entities (or synonyms thereof). Furthermore, the search can be executed based upon an identified attribute. At 1608, a ranked list of tables is generated based upon the search, and at 1610 table snippets for respective tables in the ranked list of tables are generated. At 1612, the table snippets are output. For example, the table snippets can be displayed in a graphical user interface of a spreadsheet application. The methodology 1600 completes 1614.

Figure 17:
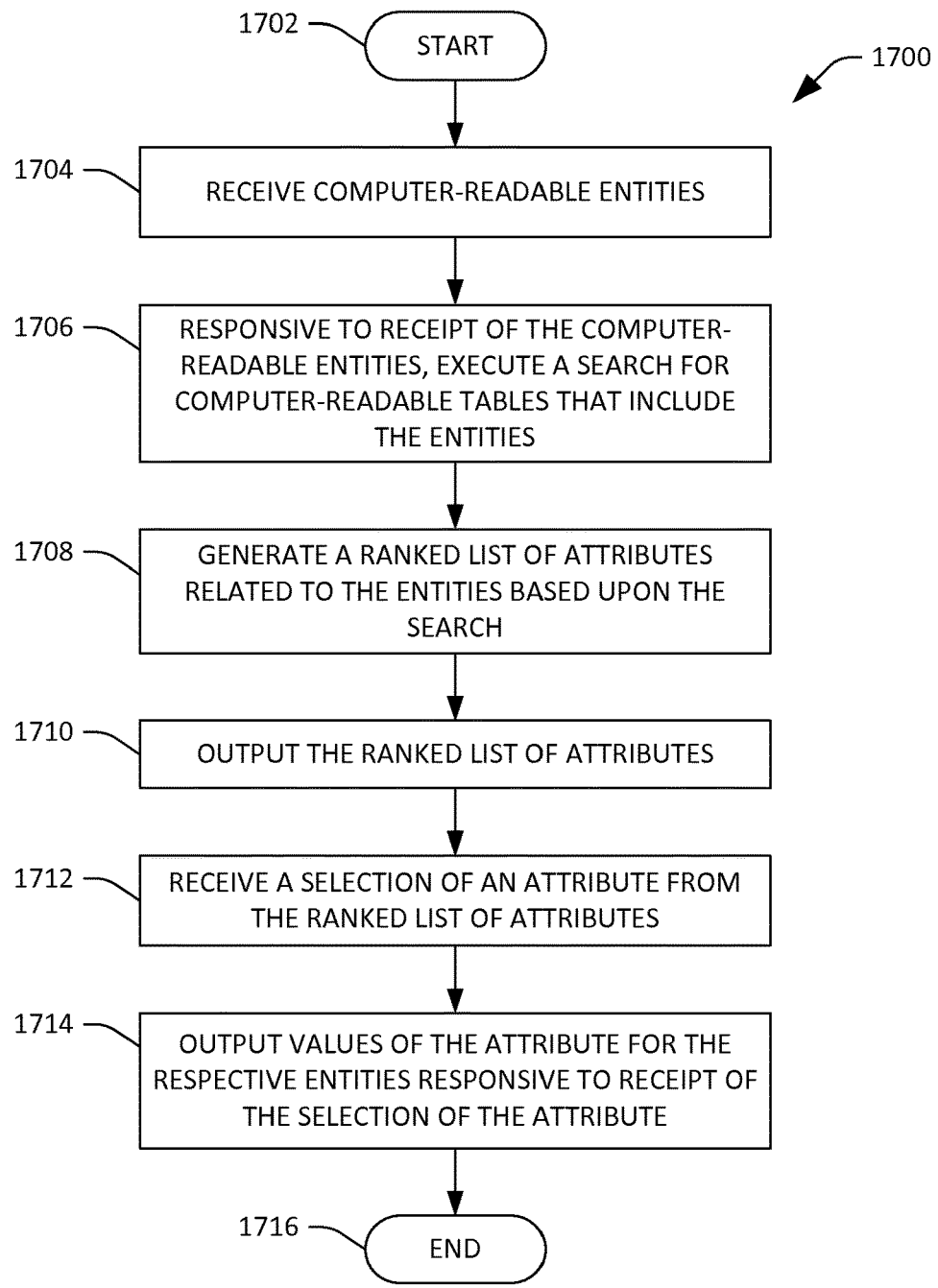
FIG. 17 is a flow diagram that illustrates an exemplary methodology for augmenting tabular data based upon selection of an attribute in a ranked list of attributes.

Now referring to FIG. 17, an exemplary methodology 1700 that facilitates generation of a ranked list of attributes is illustrated. The methodology 1700 starts at 1702, and at 1704 computer readable entities are received. At 1706, responsive to receiving the entities, a search is executed for computer-readable tables that include the entities. At 1708, a ranked list of attributes related to the entities is generated based upon the search. At 1710, the ranked list of attributes is output (e.g., transmitted to a client computing device). At 1712, a selection of an attribute from the ranked list of attributes is received, and at 1714 values of the attribute for the respective entities are output responsive to receipt of the selection of the attribute. The methodology 1700 completes at 1716.

Figure 18:
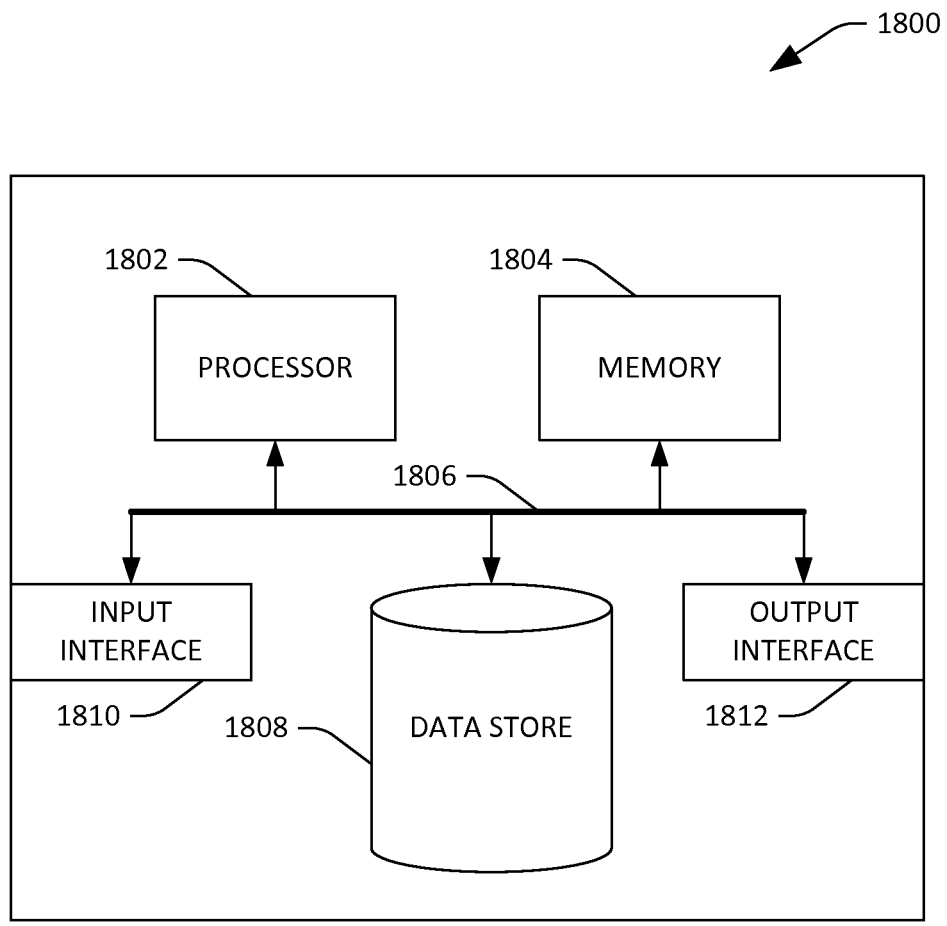
FIG. 18 is an exemplary computing system.

Referring now to FIG. 18, a high-level illustration of an exemplary computing device 1800 that can be used in accordance with the systems and methodologies disclosed herein is illustrated. For instance, the computing device 1800 may be used in a system that facilitates selection of computer-readable entities and/or attributes for use when performing a DFS search. By way of another example, the computing device 1800 can be used in a system that supports performing a search based upon identified entities and attributes. The computing device 1800 includes at least one processor 1802 that executes instructions that are stored in a memory 1804. The instructions may be, for instance, instructions for implementing functionality described as being carried out by one or more components discussed above or instructions for implementing one or more of the methods described above. The processor 1802 may access the memory 1804 by way of a system bus 1806. In addition to storing executable instructions, the memory 1804 may also store tabular data, computer-readable entities, attribute names, an index of source tables, etc.

The computing device 1800 additionally includes a data store 1808 that is accessible by the processor 1802 by way of the system bus 1806. The data store 1808 may include executable instructions, source tables, an index of source tables, computer-readable entities, etc. The computing device 1800 also includes an input interface 1810 that allows external devices to communicate with the computing device 1800. For instance, the input interface 1810 may be used to receive instructions from an external computer device, from a user, etc. The computing device 1800 also includes an output interface 1812 that interfaces the computing device 1800 with one or more external devices. For example, the computing device 1800 may display text, images, etc. by way of the output interface 1812.

It is contemplated that the external devices that communicate with the computing device 1800 via the input interface 1810 and the output interface 1812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1800 may be a distributed system. Thus, for instance, several devices may be in communication by way of a network connection and may collectively perform tasks described as being performed by the computing device 1800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system comprising:
   a processor; and
   memory that has a spreadsheet application loaded therein, wherein the spreadsheet application, when executed by the processor, causes the processor to perform acts comprising:
      displaying, on a display of the computing system, the spreadsheet in a graphical user interface of a spreadsheet application, wherein the spreadsheet comprises a table, and the table comprises a column that includes entities, wherein an entity is a string that represents a person, place, or thing, and wherein people, places, or things represented by the entities in the column have an attribute;
      receiving an indication that a user has selected the entities in the table by way of the graphical user interface of the spreadsheet application;
      receiving an indication that the user has requested a search to be performed based upon the selected entities from the column;
      transmitting the selected entities to a server computing device that is programmed with instructions that, when executed by the server computing device, cause the server computing device to search over an index of source tables based upon the selected entities;
      responsive to transmitting the selected entities to the server computing device, receiving attribute values for the attribute from the server computing device, the attribute values being values of the attribute of the computer-readable entities; and
      responsive to receiving the attribute values for the attribute, updating the spreadsheet in the graphical user interface of the spreadsheet application to include another column, wherein the another column is populated with the attribute values such that the attribute values are displayed to correspond to the selected entities.

2. The computing system of claim 1 being one of a mobile telephone or a tablet computing device.

3. The computing system of claim 1, the acts further comprising:
   prior to receiving the attribute values from the server computing device, receiving table snippets from the server computing device, the table snippets summarizing respective source tables identified by the server computing device as being relevant to the selected entities; and
   displaying the table snippets in the graphical user interface of the spreadsheet application responsive to receiving the table snippets.

4. The computing system of claim 3, the acts further comprising:
   receiving a selection of a table snippet in the table snippets, the attribute values comprised by a source table summarized by the table snippet, wherein the spreadsheet in the graphical user interface is updated to include the another column responsive to receipt of the selection of the table snippet.

5. The computing system of claim 4, the table snippet comprises a title of the source table summarized by the table snippet, data that identifies a network location of the source table, and a sample portion of the source table, wherein keywords in a query utilized to locate the source table are highlighted in the table snippet where such keywords occur in the table snippet.

6. The computing system of claim 4, the acts further comprising:
receiving an indication that a column represented in the table snippet has been selected from the table snippet, wherein updating the spreadsheet in the graphical user interface of the spreadsheet application to include the another column comprises adding contents of the column represented in the table snippet to the another column.

7. The computing system of claim of claim 1, the acts further comprising:
receiving a selection of the attribute; and
transmitting the identity of the attribute to the server computing device with the entities.

8. The computing system of claim 1, wherein the another column is adjacent to the column in the updated graphical user interface of the spreadsheet application.

9. The computing system of claim 1, the acts further comprising:
displaying a popup window in the graphical user interface of the spreadsheet application in response to receiving the indication that the user has selected the entities in the table, wherein the popup window comprises a selectable option for retrieving the attribute values, wherein the indication that the user has requested the search to be performed is receipt of selection of the selectable option.

10. A method executed at a client computing device, the method comprising:
displaying a table in a graphical user interface of a spreadsheet application on a display of the client computing device, wherein the table has a column that the column includes entities, wherein an entity is a string that represents a person, place, or thing, and wherein people, places, or things represented by the entities in the column have an attribute;
receiving an indication that a user of the client computing device has selected the entities in the column of the table;
responsive to receiving the indication that the user of the client computing device has selected the entities, transmitting the entities to a server computing device, wherein the server computing device is programmed with instructions that, when executed by the server computing device, cause the server computing device to perform a search over an index of network-accessible tables based upon the selected entities;
receiving, from the server computing device, respective attribute values for the selected entities, the attribute values being values of the attribute; and
responsive to receiving the attribute values, updating the graphical user interface of the spreadsheet application such that the table includes another column, the another column comprises the attribute values, wherein the attribute values are arranged in the another column to correspond to the entities in the column that have the attribute values.

11. The method of claim 10, the indication corresponding to one of a:
a selection the entities by way of a mouse pointer;
a selection of the entities by way of a gesture performed on a touch-sensitive display of the client computing device; or
a spoken command that identifies the entities.

12. The method of claim 10, wherein responsive to transmitting the entities to the server computing device, attributes of the entities are received from the server computing device, the attributes comprise the attribute, the method further comprises:
receiving a selection of the attribute from the attributes;
responsive to receiving the selection of the attribute from the attributes, transmitting the attribute to the server computing device, wherein
the attribute values are received from the server computing device responsive to transmitting the attribute to the server computing device.

13. The method of claim 10, further comprising:
responsive to transmitting the entities to the server computing device, receiving a ranked list of table snippets from the server computing device, each table snippet in the ranked list of table snippets summarizes a respective source table accessible by way of a network connection, each table snippet in the ranked list of table snippets comprises:
a title for the respective source table;
a network location of the respective source table; and
a representative portion of the respective source table;
prior to receiving the respective attribute values from the server computing device:
displaying the ranked list of table snippets on the display;
receiving a selection of a table snippet in the ranked list of table snippets, the table snippet summarizes a source table that comprises the attribute values;
responsive to receiving the selection of the table snippet, transmitting the selection of the table snippet to the server computing device, wherein the respective attribute values are received from the server computing device responsive to transmitting the selection of the table snippet to the server computing device.

14. The method of claim 10, wherein the client computing device is one of a mobile telephone or a tablet computing device.

15. The method of claim 10, wherein the column and the another column are adjacent to one another in the updated graphical user interface.

16. A client computing device comprising a computer-readable storage medium, the computer-readable storage medium comprising instructions that, when executed by a processor, cause the processor to perform acts comprising:
displaying a spreadsheet in a graphical user interface of a spreadsheet application, the spreadsheet comprises a table, the table comprises a column that includes entities, wherein an entity is a string that represents a person, place, or thing, and wherein people, places, or things represented by the entities in the column have an attribute;
receiving a selection of the entities in the table;
receiving an indication that a search is to be conducted based upon the entities selected in the table;
transmitting the entities and the attribute to a server computing device that is in network communication with the client computing device, the server computing device programmed with instructions that, when executed by the server computing device, cause the server computing device to execute a search for computer-readable tables based upon the entities and the attribute;

responsive to transmitting the entities and the attribute to the server computing device, receiving values of the attribute that respectively correspond to the entities; and responsive to receiving the values of the attribute, adding another column to the table in the spreadsheet displayed in the graphical user interface of the spreadsheet application, the another column comprises the values of the attribute, the values of the attribute arranged in the another column to respectively map to the entities in the column.

17. The client computing device of claim 16 being one of a mobile telephone or a tablet computing device.

18. The client computing device of claim 16, wherein the another column is adjacent to the column in the table.

19. The client computing device of claim 16, the acts further comprising:

prior to receiving the attribute values from the server computing device, receiving table snippets from the server computing device, the table snippets summarizing respective source tables identified by the server computing device as being relevant to the selected entities; and displaying the table snippets in the graphical user interface of the spreadsheet application responsive to receiving the table snippets.

20. The client computing device of claim 19, the acts further comprising:

receiving a selection of a table snippet in the table snippets, the attribute values comprised by a source table summarized by the table snippet, wherein the spreadsheet in the graphical user interface is updated to include the another column responsive to receipt of the selection of the table snippet.

* * * * *